US007693827B2

(12) United States Patent
Zamir et al.

(10) Patent No.: US 7,693,827 B2
(45) Date of Patent: Apr. 6, 2010

(54) PERSONALIZATION OF PLACED CONTENT ORDERING IN SEARCH RESULTS

(75) Inventors: Oren Eli Zamir, Nyack, NY (US); Jeffrey L. Korn, New York, NY (US); Andrew B. Fikes, Los Altos, CA (US); Stephen R. Lawrence, Mountain View, CA (US)

(73) Assignee: Google Inc., Mountain View, CA (US)

( * ) Notice: Subject to any disclaimer, the term of this patent is extended or adjusted under 35 U.S.C. 154(b) by 492 days.

(21) Appl. No.: 10/890,854

(22) Filed: Jul. 13, 2004

(65) Prior Publication Data

US 2005/0240580 A1   Oct. 27, 2005

Related U.S. Application Data

(63) Continuation-in-part of application No. 10/676,711, filed on Sep. 30, 2003.

(51) Int. Cl.
*G06F 17/30* (2006.01)
(52) U.S. Cl. .................. 707/3; 707/4; 707/5; 707/7
(58) Field of Classification Search .................. None
See application file for complete search history.

(56) References Cited

U.S. PATENT DOCUMENTS 5,724,567 A    3/1998   Rose et al. ................... 395/602

(Continued)

FOREIGN PATENT DOCUMENTS

EP            1050830 A2    11/2000

(Continued)

OTHER PUBLICATIONS

Brin, S., et al., "The Anatomy of a Large-Scale Hypertextual Web Search Engine," *Computer Networks and ISDN Systems*, vol. 30, No. 1-7, Apr. 1998, pp. 107-117.

(Continued)

*Primary Examiner*—John E Breene
*Assistant Examiner*—Thu-Nguyet Le
(74) *Attorney, Agent, or Firm*—Morgan, Lewis & Bockius LLP

(57) ABSTRACT

A system and method for using a user profile to order placed content in search results returned by a search engine. The user profile is based on search queries submitted by a user, the user's specific interaction with the documents identified by the search engine and personal information provided by the user. Placed content is ranked by a score based at least in part on a similarity of a particular placed content to the user's profile. User profiles can be created and/or stored on the client side or server side of a client-server network environment.

29 Claims, 13 Drawing Sheets

U.S. PATENT DOCUMENTS

| | | | |
|---|---|---|---|
| 5,754,939 A | 5/1998 | Herz et al. | 455/4.2 |
| 6,012,051 A * | 1/2000 | Sammon et al. | 706/52 |
| 6,182,068 B1 * | 1/2001 | Culliss | 707/5 |
| 6,285,999 B1 | 9/2001 | Page | 707/5 |
| 6,327,590 B1 | 12/2001 | Chidlovskii et al. | 707/5 |
| 6,385,619 B1 | 5/2002 | Eichstaedt et al. | 707/1 |
| 6,421,675 B1 | 7/2002 | Ryan et al. | 707/100 |
| 6,535,888 B1 * | 3/2003 | Vijayan et al. | 707/104.1 |
| 6,606,619 B2 * | 8/2003 | Ortega et al. | 707/2 |
| 6,868,525 B1 * | 3/2005 | Szabo | 715/738 |
| 6,892,198 B2 | 5/2005 | Perisic et al. | 707/5 |
| 6,895,406 B2 | 5/2005 | Fables et al. | 707/102 |
| 6,912,505 B2 | 6/2005 | Linden et al. | 705/14 |
| 7,031,961 B2 | 4/2006 | Pitkow et al. | 707/4 |
| 7,240,049 B2 | 7/2007 | Kapur | 707/3 |
| 2002/0073065 A1 | 6/2002 | Inaba et al. | 707/1 |
| 2002/0123988 A1 | 9/2002 | Dean et al. | 707/3 |
| 2002/0198882 A1 | 12/2002 | Linden et al. | 707/10 |
| 2003/0149937 A1 * | 8/2003 | McElfresh et al. | 715/517 |
| 2004/0044571 A1 | 3/2004 | Bronnimann et al. | 705/14 |
| 2004/0267806 A1 * | 12/2004 | Lester | 707/103 R |
| 2005/0071741 A1 | 3/2005 | Acharya et al. | 715/500 |
| 2005/0144193 A1 | 6/2005 | Henzinger | 707/103 |
| 2005/0240580 A1 | 10/2005 | Zamir et al. | 707/4 |
| 2007/0088692 A1 | 4/2007 | Dean et al. | 707/5 |
| 2007/0088693 A1 | 4/2007 | Lawrence | 707/5 |
| 2007/0094254 A1 | 4/2007 | Cutts et al. | 707/5 |
| 2007/0094255 A1 | 4/2007 | Acharya et al. | 707/5 |

FOREIGN PATENT DOCUMENTS

| | | |
|---|---|---|
| EP | 1 107 128 A1 | 6/2001 |
| WO | WO 03/107127 A2 | 12/2003 |
| WO | WO 2005/001719 A1 | 1/2005 |
| WO | WO 2005/033979 | 4/2005 |
| WO | WO 2005/055015 A2 | 6/2005 |
| WO | WO 2006/014562 A1 | 2/2006 |

OTHER PUBLICATIONS

Cho, J., et al., "Efficient Crawling Through URL Ordering," *Computer Networks and ISDN Systems*, vol. 30, No. 1-7, Apr. 1998, pp. 161-171.

Haveliwala, T.H., "Topic-Sensitive PageRank," *Proc. of the 11th Int'l World Wide Web Conf.*, Honolulu, Hawaii, May 2002.

Jeh, Glen, et al., "Scaling Personalized Web Search," Stanford Univ. Technical Report, 2002.

Pretschner, A., et al., "Ontology Based Personalized Search," *Proc. 11th IEEE Int'l Conf. on Tools with Artificial Intelligence*, Chicago, Illinois, Nov. 1999, pp. 391-398.

International Search Report for International Application No. PCT/US2005/025081, mailed Dec. 2, 2005.

Joachims, T., et al. "Accurately Interpreting Clickthrough Data as Implicit Feedback," Proceedings of the $28^{th}$ Annual Int'l ACM SIGIR Conference on Research and Development in Information Retrieval, Aug. 15, 2005, pp. 154-161.

Juan, Y-F, et al., "An Analysis of Search Engine Switching Behavior Using Click Streams," Internet and Network Economics Lecture Notes in Computer Science, vol. 3828, 2005, pp. 806-815.

Ramachandran, P., "Discovering User Preferences by Using Time Entries in Click-Through Data to Improve Search Engine Results," Discovery Science Lecture Notes in Computer Science, Artificial Intelligence, vol. 3735, 2005, pp. 383-385.

Zhao, M., et al., "Adapting Document Ranking to Users' Preferences Using Click-Through Data," Information Retrieval Technology Lecture Notes in Computer Science, vol. 4182, 2006, pp. 26-42.

"Yahoo! Search Builder-Design Search Box," http://web.archive.org/web/2006813082935/http://builder.search.yahoo.com/m/promo, Aug. 13, 2006, 1 page.

"Guide to Custom Search Engines (CSEs)," http://web.archive.org/web/20061027235927/http://www.customsearchguide.com, Oct. 27, 2006, 1 page.

Ding, J., et al., "Computing Geographical Scopes of Web Resources," Proceedings of the $25^{th}$ VLDB Conf., Cairo, Egypt 2000.

Henzinger, M., "Web Information Retrieval—an Algorithmic Perspective," Lecture Notes in Computer Science, Proceedings of the $8^{th}$ Annual European Symposium, Saarbruken, Germany, Sep. 2000, pp. 1-8.

International Search Report for International Application No. PCT/US07/065710, mailed Nov. 12, 2007.

* cited by examiner

Term-based Profile Table 300

| USER_ID | (TERM_1, WEIGHT_1) | (TERM_2, WEIGHT_2) | . . . | (TERM_N, WEIGHT_N) |
|---|---|---|---|---|
| . | . | . | . | . |
| . | . | . | . | . |
| . | . | . | . | . |

320 — USER_ID column
340 — (TERM, WEIGHT) columns
310 — rows

Category-based Profile Table 450

Context Analysis

Term-based Document Information Table 810

| DOC_ID | (TERM_1, WEIGHT_1) | (TERM_2, WEIGHT_2) | . . . | (TERM_X, WEIGHT_X) | Term-based Ranking Score |
|---|---|---|---|---|---|
| | | | | | |
| ... | ... | ... | ... | ... | ... |
| | | | . . . | | |

Category-based Document Information Table 830

| DOC_ID | (CATEGORY_1, WEIGHT_1) | (CATEGORY_2, WEIGHT_2) | . . . | (CATEGORY_Y, WEIGHT_Y) | Category-based Ranking Score |
|---|---|---|---|---|---|
| | | | | | |
| ... | ... | ... | ... | ... | ... |
| | | | . . . | | |

Link-based Document Information Table 850

| DOC_ID | (LINK_1, WEIGHT_1) | (LINK_2, WEIGHT_2) | . . . | (LINK_Z, WEIGHT_Z) | Link-based Ranking Score |
|---|---|---|---|---|---|
| | | | | | |
| ... | ... | ... | ... | ... | ... |
| | | | . . . | | |

Fig. 8

PERSONALIZATION OF PLACED CONTENT ORDERING IN SEARCH RESULTS

RELATED APPLICATIONS

This application is a continuation-in-part of U.S. patent application Ser. No. 10/676,711, filed Sep. 30, 2003, which application is incorporated by reference herein in its entirety.

FIELD OF THE INVENTION

The present invention relates generally to the field of a search engine in a computer network system, in particular to system and method of creating and using a user profile to customize ordering of placed content in response to search queries submitted by the user.

BACKGROUND OF THE INVENTION

Search engines provide a powerful source of indexed documents from the Internet (or an intranet) that can be rapidly scanned in response to a search query submitted by a user. Such a query is usually very short (on average about two to three words). As the number of documents accessible via the Internet grows, the number of documents that match the query may also increase. However, not every document matching the query is equally important from the user's perspective. As a result, a user is easily overwhelmed by an enormous number of documents returned by a search engine, if the engine does not order the search results based on their relevance to the user's query.

One approach to improving the relevance of search results to a search query is to use the link structure of different web pages to compute global "importance" scores that can be used to influence the ranking of search results. This is sometimes referred to as the PageRank algorithm. A more detailed description of the PageRank algorithm can be found in the article "The Anatomy of a Large-Scale Hypertextual Search Engine" by S. Brin and L. Page, $7^{th}$ International World Wide Web Conference, Brisbane, Australia and U.S. Pat. No. 6,285,999, both of which are hereby incorporated by reference as background information.

An important assumption in the PageRank algorithm is that there is a "random surfer" who starts his web surfing journey at a randomly picked web page and keeps clicking on the links embedded in the web pages, never hitting the "back" button. Eventually, when this random surfer gets bored of the journey, he may re-start a new journey by randomly picking another web page. The probability that the random surfer visits (i.e., views or downloads) a web page depends on the web page's page rank.

From an end user's perspective, a search engine using the PageRank algorithm treats a search query the same way no matter who submits the query, because the search engine does not ask the user to provide any information that can uniquely identify the user. The only factor that affects the search results is the search query itself, e.g., how many terms are in the query and in what order. The search results are a best fit for the interest of an abstract user, the "random surfer", and they are not be adjusted to fit a specific user's preferences or interests.

In reality, a user like the random surfer never exists. Every user has his own preferences when he submits a query to a search engine. The quality of the search results returned by the engine has to be evaluated by its users' satisfaction. When a user's preferences can be well defined by the query itself, or when the user's preference is similar to the random surfer's preference with respect to a specific query, the user is more likely to be satisfied with the search results. However, if the user's preference is significantly biased by some personal factors that are not clearly reflected in a search query itself, or if the user's preference is quite different from the random user's preference, the search results from the same search engine may be less useful to the user, if not useless.

As suggested above, the journey of the random surfer tends to be random and neutral, without any obvious inclination towards a particular direction. When a search engine returns only a handful of search results that match a query, the order of the returned results is less significant because the requesting user may be able to afford the time to browse each of them to discover the items most relevant to himself. However, with billions of web pages connected to the Internet, a search engine often returns hundreds or even thousands of documents that match a search query. In this case, the ordering of the search results is very important. A user who has a preference different from that of the random surfer may not find what he is looking for in the first five to ten documents listed in the search results. When that happens, the user is usually left with two options: (1) either spending the time required to review more of the listed documents so as to locate the relevant documents; or (2) refining the search query so as to reduce the number of documents that match the query. Query refinement is often a non-trivial task, sometimes requiring more knowledge of the subject or more expertise with search engines than the user possesses, and sometimes requiring more time and effort than the user is willing to expend.

For example, assume that a user submits to a search engine a search query having only one term "blackberry". Without any other context, on the top of a list of documents returned by a PageRank-based search engine may be a link to www.blackberry.net, because this web page has the highest page rank. However, if the query requester is a person with interests in foods and cooking, it would be more useful to order the search results so as to include at the top of the returned results web pages with recipes or other food related text, pictures or the like. It would be desirable to have a search engine that is able to reorder its search results, or to otherwise customize the search results, so as to emphasize web pages that are most likely to be of interest to the person submitting the search query. Further, it would be desirable for such a system to require minimal input from individual users, operating largely or completely without explicit input from the user with regard to the user's preferences and interests. Finally, it would be desirable for such a system to meet users' requirements with respect to security and privacy.

SUMMARY

In a method of personalizing placed content, an interest of a user is determined, and a user profile associated with the user is accessed. A set of placed content that matches the interest of the user is identified, and the set of placed content is ordered in accordance with the user profile.

In one aspect of the invention, a search engine utilizes user profiles to customize search results, which may include placed content as well as other or general content. A user profile comprises multiple items that characterize a user's interests or preferences. These items are extracted from various information sources, including previous search queries submitted by the user, links from or to the documents identified by the previous queries, sampled content from the identified documents as well as personal information implicitly or explicitly provided by the user.

When the search engine receives a search query from a user, it identifies a set of placed content that matches the search query. Each placed content is associated with a rank based at least in part a similarity of the placed content to the user profile. The placed content items are then ordered according to their ranks.

The present invention, including user profile construction and search results re-ordering and/or scoring, can be implemented on either the client side or the server side of a client-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

FIG. 8 illustrates a plurality of exemplary data structures that may be used for storing information about documents after term-based, category-based and/or link-based analyses, respectively.

Like reference numerals refer to corresponding parts throughout the several views of the drawings.

DESCRIPTION OF EMBODIMENTS

The embodiments discussed below include systems and methods that create a user profile based a user's past experience with a search engine and then use the user profile to rank search results in response to search queries provided by the user.

Figure 1:
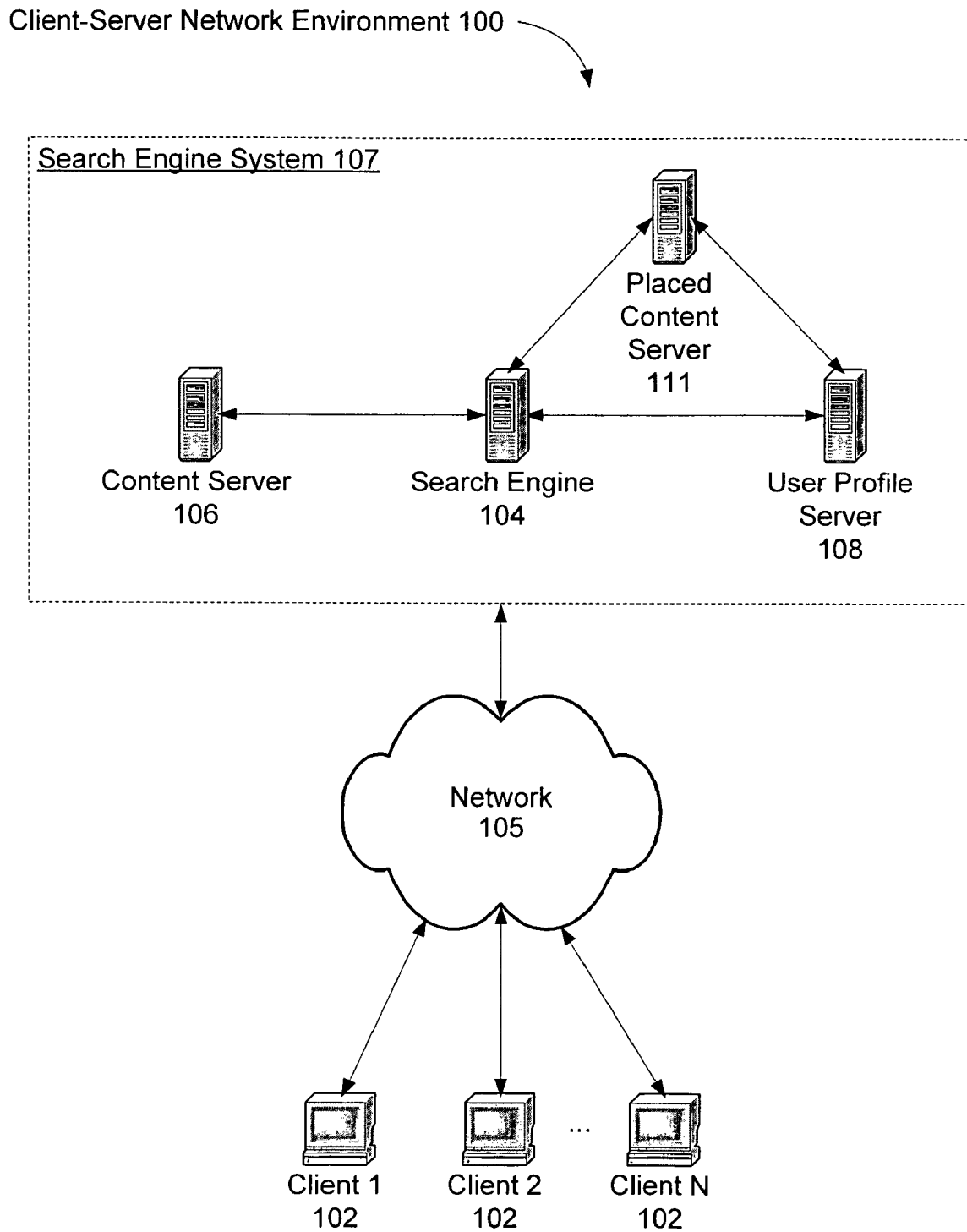
FIG. 1 illustrates a client-server network environment.

FIG. 1 provides an overview of a typical client-server network environment 100 in which the present invention may be implemented. A plurality of clients 102 are connected to a search engine system 107 through a network 105, e.g., the Internet. Search engine system 107 comprises one or more search engines 104. A search engine 104 is responsible for processing a search query submitted by a client 102, generating search results in accordance with the search query and returning the results to the client. Search engine system 107 may also comprise one or more content servers 106, one or more user profile servers 108, and one or more placed content servers 111. A content server 106 stores a large number of indexed documents retrieved from different websites. Alternately, or in addition, the content server 106 stores an index of documents stored on various websites. In one embodiment, each indexed document is assigned a page rank according to the document's link structure. The page rank serves as a query independent measure of the document's importance. A search engine 104 communicates with one or more content servers 106 to select a plurality of documents in response to a specific search query. The search engine assigns a score to each document based on the document's page rank, the text associated with the document, and the search query. A search engine 104 may communicate with one or more placed content servers 111 to provide advertisements, or other types of placed content, in conjunction with the search results. Placed content servers 111 may communicate with the one or more user profile servers 108. Placed content is described more fully below.

A user profile server 108 stores a plurality of user profiles. Each profile includes information that uniquely identifies a user as well as his previous search experience and personal information, which can be used to refine search results in response to the search queries submitted by this user. Different approaches are available for user profile construction. For example, a user profile can be created by requiring a first-time user to fill in a form or answer a survey. This approach may be useful in certain applications such as opening a bank account. But it is hardly a favorable one in the context of a search engine. First, a user's interaction with a search engine is usually a dynamic process. As time goes on, the user's interests may change. This change may be reflected by the search queries submitted by the user, or by the user's handling of the search results, or both. The user's answers to questions on a form tend to become less useful over time, unless the user chooses to update his answers periodically. Unlike an occasional update of phone number in the case of an on-line bank account, frequent updates of a user profile in the case of a search engine significantly affect its user friendliness, which is an important consideration when a user chooses among the search engines currently available. Further, it is known that users are reluctant to provide explicit feedback, such as filling out of a form, as many users find it too burdensome. Thus, while some users may provide explicit feedback on their interests, it is desirable to have a procedure for implicitly obtaining information about the user's interests without requiring any explicit or new actions by the user.

Figure 2:
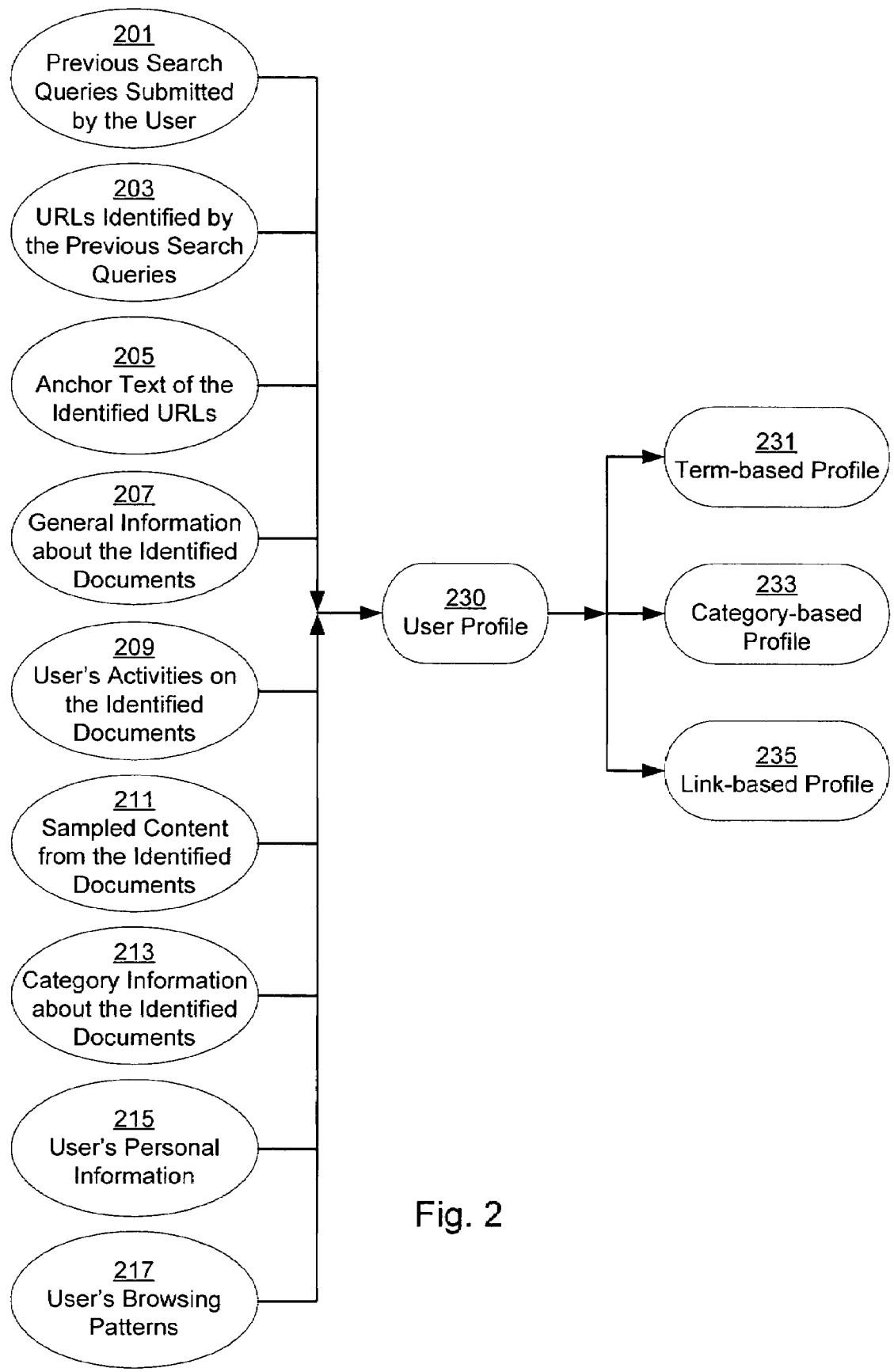
FIG. 2 illustrates multiple sources of user information and their relationship to a user profile.

It is has been observed that a search engine user's past search activities provide useful hints about the user's personal search preferences. FIG. 2 provides a list of sources of user information that are beneficial for user profile construction. For example, previously submitted search queries 201 are very helpful in profiling a user's interests. If a user has submitted multiple search queries related to diabetes, it is more likely than not that this is a topic of interest to the user. If the user subsequently submits a query including the term "organic food", it can be reasonably inferred that he may be more interested in those organic foods that are helpful in fighting diabetes. Similarly, the universal resource locators (URL) 203 associated with the search results in response to the previous search queries and their corresponding anchor texts 205, especially for search result items that have been selected or "visited" by the user (e.g., downloaded or otherwise viewed by the user), are helpful in determining the user's preferences. When a first page contains a link to a second page, and the link has text associated with it (e.g., text neighboring the link), the text associated with the link is called "anchor text" with respect to the second page. Anchor text establishes a relationship between the text associated with a URL link in a document and another document to which the URL link points. The advantages of anchor text include that it often provides an accurate description of the document to which the URL link points, and it can be used to index documents that cannot be indexed by a text-based search engine, such as images or databases.

After receiving search results, the user may click on some of the URL links, thereby downloading the documents referenced by those links, so as to learn more details about those documents. Certain types of general information 207 can be associated with a set of user selected or use identified documents. For purposes of forming a user profile, the identified documents from which information is derived for inclusion in the user profile may include: documents identified by search results from the search engine, documents accessed (e.g., viewed or downloaded, for example using a browser application) by the user (including documents not identified in prior search results), documents linked to the documents identified by search results from the search engine, and documents linked to the documents accessed by the user, or any subset of such documents.

The general information 207 about the identified documents may answer questions such as, what is the format of the document? Is it in hypertext markup language (HTML), plain text, portable document format (PDF), or Microsoft Word? What is the topic of the document? Is it about science, health or business? This information is also helpful in profiling the user's interests. In addition, information about a user's activities 209 with respect to the user selected documents (sometimes herein call the identified documents), such as how long the user spent viewing the document, the amount of scrolling activity on the document, and whether the user has printed, saved or bookmarked the document, also suggests the importance of the document to the user as well as the user's preferences. In some embodiments, information about user activities 209 is used both when weighting the importance of information extracted or derived from the user identified documents. In some embodiments, information about user activities 209 is used to determine which of the user identified documents to use as the basis for deriving the user profile. For example, information 209 may be used to select only documents that received significant user activity (in accordance with predefined criteria) for generating the user profile, or information 209 may be used to exclude from the profiling process documents that the user viewed for less than a predefined threshold amount of time.

The content of the identified documents from previous search activities is a rich source of information about a user's interests and preferences. Key terms appearing in the identified documents and their frequencies with which they appear in the identified documents are not only useful for indexing the document, but are also a strong indication of the user's personal interests, especially when they are combined with other types of user information discussed above. In one embodiment, instead of the whole documents, sampled content 211 from the identified documents is extracted for the purpose of user profile construction, to save storage space and computational cost. In another embodiment, various information related to the identified documents may be classified to constitute category information 213 about the identified documents. The various information could include the types of individuals who have visited the page previously or other meta-data which could describe the document. More discussion about content sampling, the process of identifying key terms in an identified document and the usage of the category information is provided below.

Another potential source of information for a user profile is the user's browsing patterns 217. The user's browsing patterns may be represented by the URLs visited by the user over a period of time, such as the preceding N days (e.g., 60 days).

In some embodiments, user profile information is weighted in accordance with its age, with more recent information being given larger weight and less recent information being given smaller weight. This helps the user profile to better track changes in the user's interests, and to reduce the impact of passing interests or subjects of dwindling interest to the user. A variety of data structures can be used to support a time weighted user profile, typically including a number of bins or tiers for holding user information associated with a sequence of time periods.

Optionally, a user may choose to offer personal information 215, including demographic and geographic information associated with the user, such as the user's age or age range, educational level or range, income level or range, language preferences, marital status, geographic location (e.g., the city, state and country in which the user resides, and possibly also including additional information such as street address, zip code, and telephone area code), cultural background or preferences, or any subset of these. Compared with other types of personal information such as a user's favorite sports or movies that are often time varying, this personal information is more static and more difficult to infer from the user's search queries and search results, but may be crucial in correctly interpreting certain queries submitted by the user. For example, if a user submits a query containing "Japanese restaurant", it is very likely that he may be searching for a local Japanese restaurant for dinner. Without knowing the user's geographical location, it is hard to order the search results so as to bring to the top those items that are most relevant to the user's true intention. In certain cases, however, it is possible to infer this information. For example, users often select results associated with a specific region corresponding to where they live.

Creating a user profile 230 from the various sources of user information is a dynamic and complex process. In some embodiments, the process is divided into sub-processes. Each sub-process produces one type of user profile characterizing a user's interests or preferences from a particular perspective. They are:

a term-based profile 231—this profile represents a user's search preferences with a plurality of terms, where each term is given a weight indicating the importance of the term to the user;

a category-based profile 233—this profile correlates a user's search preferences with a set of categories, which may be organized in a hierarchal fashion, with each category being given a weight indicating the extent of correlation between the user's search preferences and the category; and a link-based profile 235—this profile identifies a plurality of links that are directly or indirectly related to the user's search preferences, with each link being given a weight indicating the relevance between the user's search preferences and the link.

In some embodiments, the user profile 230 includes only a subset of these profiles 231, 233, 235, for example just one or two of these profiles. In one embodiment, the user profile 230 includes a term-based profile 231 and a category-based profile 233, but not a link-based profile 235.

A category-based profile 233 may be constructed, for instance, by mapping sets of search terms (e.g., from each individual query) or identified content terms (from a particular identified document) to categories, and then aggregating the resulting sets of categories, weighting the categories both in terms of their frequency of occurrence and the relevance of the search terms or identified content terms to the categories. Alternately, all the search terms or identified content terms accumulated over a period of time may be treated as a group, for mapping into weighted categories. Furthermore, user provided personal information 215 may be mapped into weighted categories and those categories may be combined or aggregated with the weighted categories generated using any of the techniques discussed above. Other suitable ways of mapping user related information into categories may also be used.

In some embodiments, the user profile 230 is an aggregated profile based on information associated with multiple users. The users whose profile information is aggregated may be selected or identified in a number of ways. For instance, all the users who are members of a club or other organization, or employees of a particular company, may have their profile information aggregated. In another example, users having similar pre-aggregation user profiles may have their profile information aggregated. Alternately, an organization or web site may have a "user profile" associated with it, which may be automatically generated based on activities of the organization's members or which may be customized by or for the organization. A search engine or other service may utilize the organization's user profile when executing a search query or when providing placed content or other content in conjunction with any other suitable information service to help select content that is of interest to the requester or subscriber.

In one embodiment, a user profile is created and stored on a server (e.g., user profile server 108) associated with a search engine. The advantage of such deployment is that the user profile can be easily accessed by multiple computers, and that since the profile is stored on a server associated with (or part of) the search engine 104, it can be easily used by the search engine 104 to personalize the search results. In another embodiment, the user profile can be created and stored on the user's computer, sometimes called the client in a network environment. Creating and storing a user profile on a user's computer (e.g., in a cookie) not only reduces the computational and storage cost for the search engine's servers, but also satisfies some users' privacy requirements. In yet another embodiment, the user profile may be created and updated on the client, but stored on a server. Such embodiment combines some of the benefits illustrated in the other two embodiments. A disadvantage of this arrangement is that it may increase the network traffic between clients and the servers. It is understood by a person of ordinary skill in the art that the user profiles of the present invention can be implemented using client computers, server computers, or both.

Figures 3, 5:
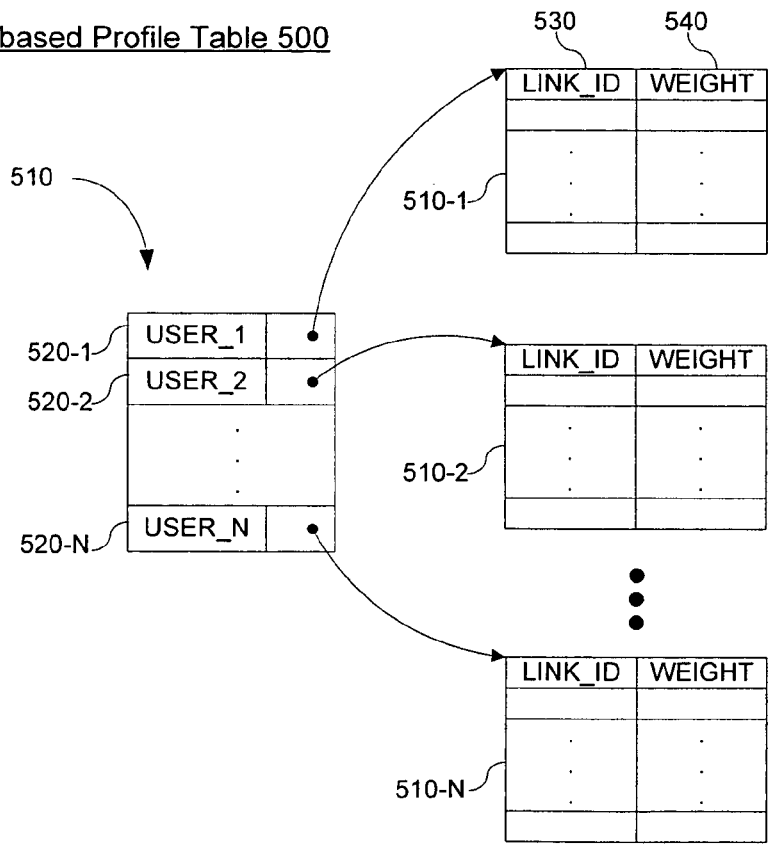
FIG. 3 is an exemplary data structure that may be used for storing term-based profiles for a plurality of users.
FIG. 5 is an exemplary data structure that may be used for storing link-based profiles for a plurality of users.

FIG. 3 illustrates an exemplary data structure, a term-based profile table 300, that may be used for storing term-based profiles for a plurality of users. Table 300 includes a plurality of records 310, each record corresponding to a user's term-based profile. A term-based profile record 310 includes a plurality of columns including a USER_ID column 320 and multiple columns of (TERM, WEIGHT) pairs 340. The USER_ID column stores a value that uniquely identifies a user or a group of users sharing the same set of (TERM, WEIGHT) pairs, and each (TERM, WEIGHT) pair 340 includes a term, typically 1-3 words long, that is usually important to the user or the group of users and a weight associated with the term that quantifies the importance of the term. In one embodiment, the term may be represented as one or more n-grams. An n-gram is defined as a sequence of n tokens, where the tokens may be words. For example, the phrase "search engine" is an n-gram of length 2, and the word "search" is an n-gram of length 1.

N-grams can be used to represent textual objects as vectors. This makes it possible to apply geometric, statistical and other mathematical techniques, which are well defined for vectors, but not for objects in general. In the present invention, n-grams can be used to define a similarity measure between two terms based on the application of a mathematical function to the vector representations of the terms.

The weight of a term is not necessarily a positive value. If a term has a negative weight, it may suggest that the user prefers that his search results should not include this term and the magnitude of the negative weight indicates the strength of the user's preference for avoiding this term in the search results. By way of example, for a group of surfing fans at Santa Cruz, Calif., the term-based profile may include terms like "surfing club", "surfing event" and "Santa Cruz" with positive weights. The terms like "Internet surfing" or "web surfing" may also be included in the profile. However, these terms are more likely to receive a negative weight since they are irrelevant and confusing with the authentic preference of the users sharing this term-based profile.

A term-based profile itemizes a user's preference using specific terms, each term having certain weight. If a document matches a term in a user's term-based profile, i.e., its content includes exactly this term, the term's weight will be assigned to the document; however, if a document does not match a term exactly, it will not receive any weight associated with this term. Such a requirement of relevance between a document and a user profile sometimes may be less flexible when dealing with various scenarios in which a fuzzy relevance between a user's preference and a document exists. For example, if a user's term-based profile includes terms like "Mozilla" and "browser", a document containing no such terms, but other terms like "Galeon" or "Opera" will not receive any weight because they do not match any existing term in the profile, even though they are actually Internet browsers. To address the need for matching a user's interests without exact term matching, a user's profile may include a category-based profile.

Figure 4A:
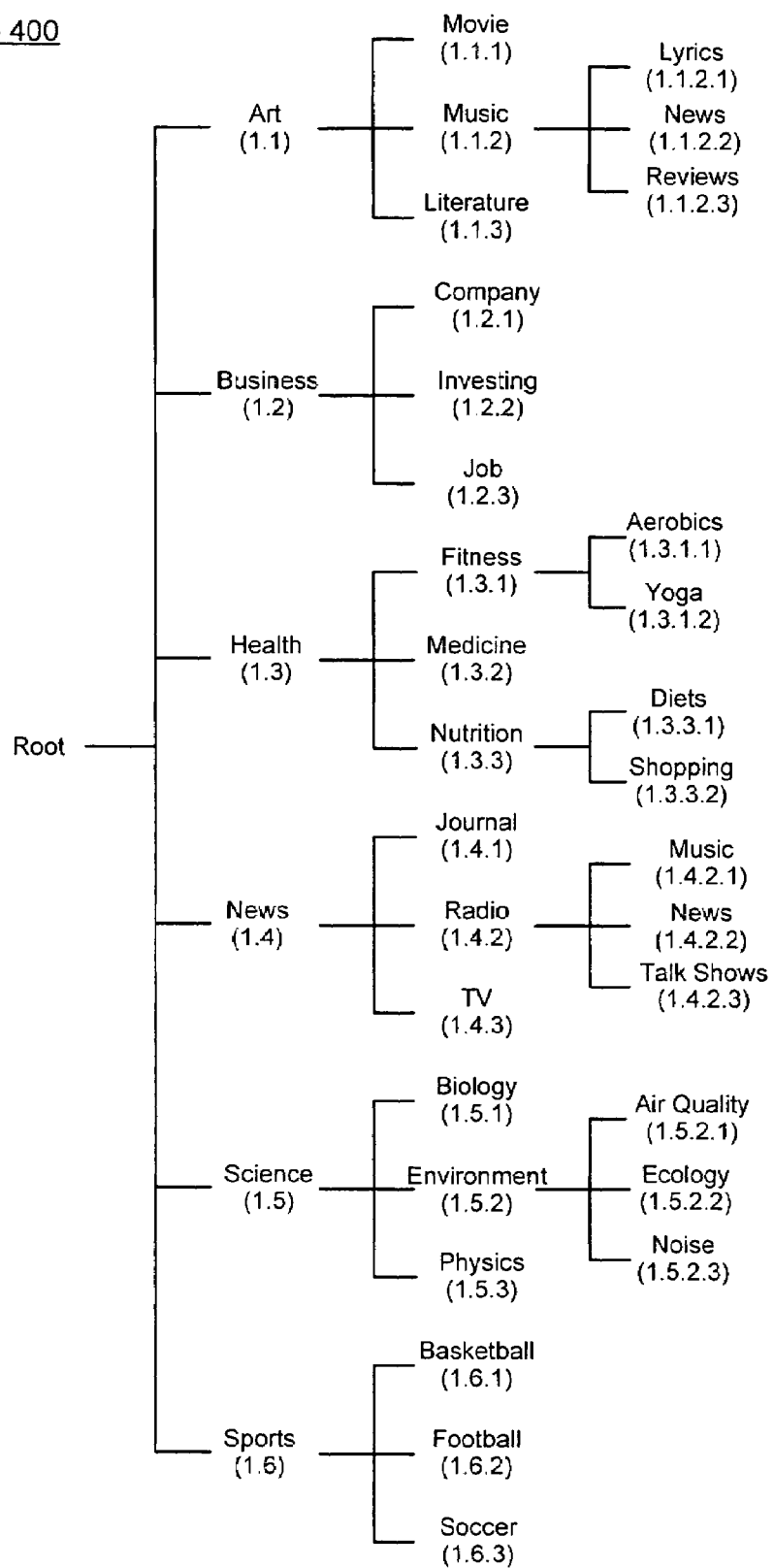
FIG. 4A is an exemplary category map that may be used for classifying a user's past search experience.

FIG. 4A illustrates a hierarchal category map 400 according to the Open Directory Project (http://dmoz.org/). Starting from the root level of map 400, documents are organized under several major topics, such as "Art", "News", "Sports", etc. These major topics are often too broad to delineate a user's specific interest. Therefore, they are further divided into sub-topics that are more specific. For example, topic "Art" may comprise sub-topics like "Movie", "Music" and "Literature" and the sub-topic "Music" may further comprise sub-sub-topics like "Lyrics", "News" and "Reviews". Note that each topic is associated with a unique CATEGORY_ID like 1.1 for "Art", 1.4.2.3 for "Talk Show" and 1.6.1 for "Basketball".

Although FIG. 4A illustrates exemplary categories using the Open Directory Project, other types of categories could also be used. For example, categories could be determined by analyzing the various contents of documents or other information to produce categories of relevant information organized around concepts. In other terms, words or phrases can be mapped to clusters that relate to various concepts. One of ordinary skill in the art would recognize many different ways to categorize information into clusters that could aid in determining a document's relation to different concepts.

Figure 4B:
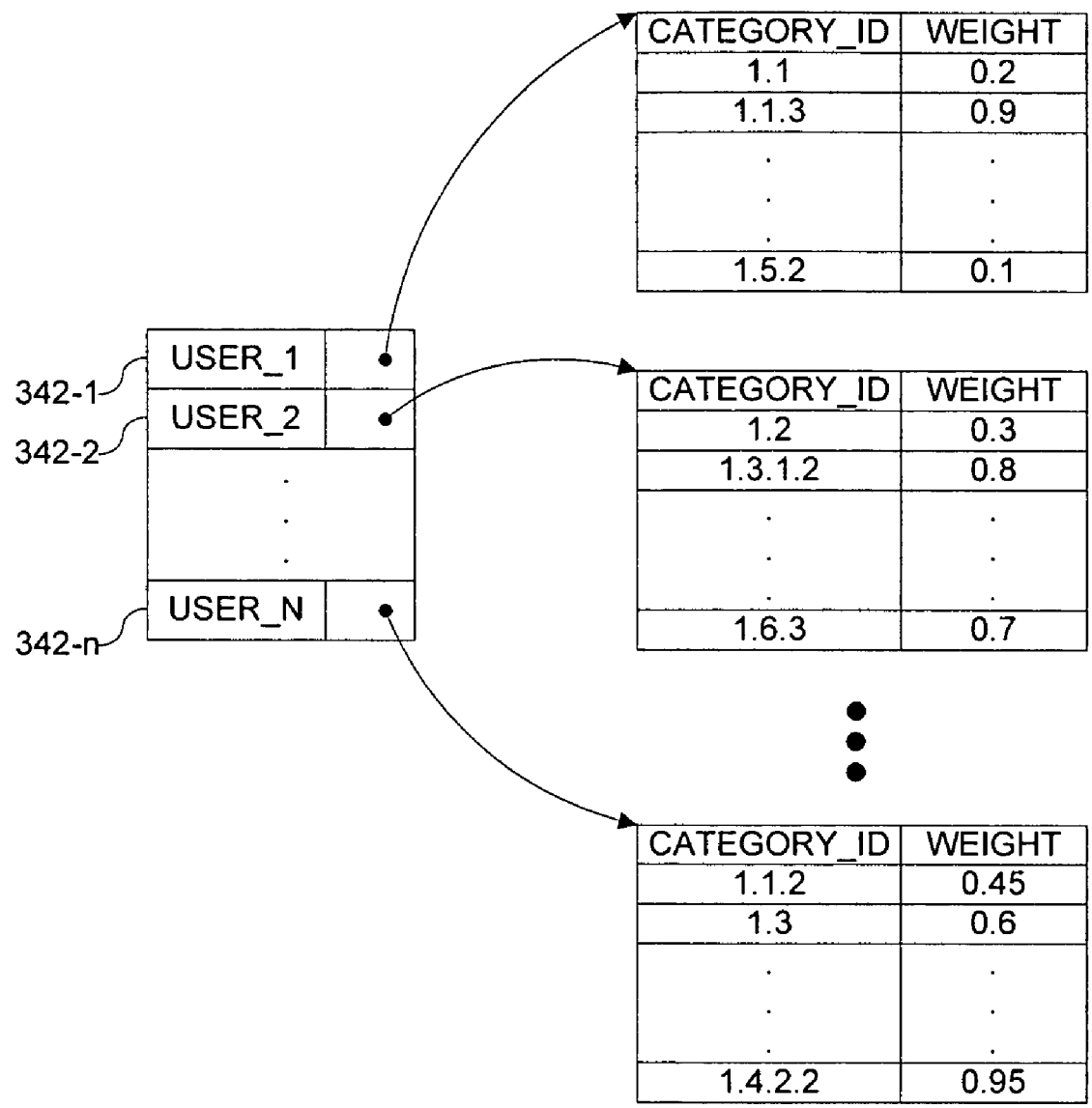
FIG. 4B is an exemplary data structure that may be used for storing category-based profiles for a plurality of users.

A user's specific interests may be associated with multiple categories at various levels, each of which may have a weight indicating the degree of relevance between the category and the user's interest. The categories and weights could be determined by analyzing any or all of the information previously discussed relating to the user. In some embodiments, the categories are determined by analyzing any one or more of the following sets of information: previous search queries submitted by the user 201, URLs identified by the previous search queries 203, general information 207 about the identified documents 207 (e.g., meta-data embedded in or otherwise associated with the identified documents), the user's activities with respect to the identified documents 209 (e.g., user clicks on general content and/or placed content), sampled content from the identified documents 211, category information about the identified documents 213, the user's personal information 215, or any combination thereof. In one embodiment, a category-based profile may be implemented using a Hash table data structure as shown in FIG. 4B. A category-based profile table 450 includes a table 455 that comprises a plurality of records 460, each record including a USER_ID and a pointer pointing to another data structure, such as table 460-1. Table 460-1 may include two columns, CATEGORY_ID column 470 and WEIGHT column 480. CATEGORY_ID column 470 contains a category's identification number as shown in FIG. 4A, suggesting that this category is relevant to the user's interests and the value in the WEIGHT column 480 indicates the degree of relevance of the category to the user's interests.

A user profile based upon the category map 400 is a topic-oriented implementation. The items in a category-based profile can also be organized in other ways. In one embodiment, a user's preference can be categorized based on the formats of the documents identified by the user, such as HTML, plain text, PDF, Microsoft Word, etc. Different formats may have different weights. In another embodiment, a user's preference can be categorized according to the types of the identified documents, e.g., an organization's homepage, a person's homepage, a research paper, or a news group posting, each type having an associated weight. Another type category that can be used to characterize a user's search preferences is document origin, for instance the country associated with each document's host. In yet another embodiment, the above-identified category-based profiles may co-exist, with each one reflecting one aspect of a user's preferences.

Besides term-based and category-based profiles, another type of user profile is referred to as a link-based profile. As discussed above, the PageRank algorithm is based on the link structure that connects various documents over the Internet. A document that has more links pointing to it is often assigned a higher page rank and therefore attracts more attention from a search engine. Link information related to a document identified by a user can also be used to infer the user's preferences. In one embodiment, a list of preferred URLs are identified for a user by analyzing the frequency of his access to those URLs. Each preferred URL may be further weighted according to the time spent by the user and the user's scrolling activity at the URL, and/or other user activities (209, FIG. 2) when visiting the document at the URL. In another embodiment, a list of preferred hosts are identified for a user by analyzing the user's frequency of accessing web pages of different hosts. When two preferred URLs are related to the same host the weights of the two URLs may be combined to determine a weight for the host. In another embodiment, a list of preferred domains are identified for a user by analyzing the user's frequency of accessing web pages of different domains. For example, for finance.yahoo.com, the host is "finance.yahoo.com" while the domain is "yahoo.com".

FIG. 5 illustrates a link-based profile using a Hash table data structure. A link-based profile table 500 includes a table 510 that includes a plurality of records 520, each record including a USER_ID and a pointer pointing to another data structure, such as table 510-1. Table 510-1 may include two columns, LINK_ID column 530 and WEIGHT column 540. The identification number stored in the LINK_ID column 530 may be associated with a preferred URL or host. The actual URL/host/domain may be stored in the table instead of the LINK_ID, however it is preferable to store the LINK_ID to save storage space.

A preferred list of URLs and/or hosts includes URLs and/or hosts that have been directly identified by the user. The preferred list of URLs and/or host may furthermore extend to URLs and/or hosts indirectly identified by using methods such as collaborative filtering or bibliometric analysis, which are known to persons of ordinary skill in the art. In one embodiment, the indirectly identified URLs and/or host include URLs or hosts that have links to/from the directly identified URLs and/or hosts. These indirectly identified URLs and/or hosts are weighted by the distance between them and the associated URLs or hosts that are directly identified by the user. For example, when a directly identified URL or host has a weight of 1, URLs or hosts that are one link away may have a weight of 0.5, URLs or hosts that are two links away may have a weight of 0.25, etc. This procedure can be further refined by reducing the weight of links that are not related to the topic of the original URL or host, e.g., links to copyright pages or web browser software that can be used to view the documents associated with the user selected URL or host. Irrelevant Links can be identified based on their context or their distribution. For example, copyright links often use specific terms (e.g., copyright or "All rights reserved" are commonly used terms in the anchor text of a copyright link); and links to a website from many unrelated websites may suggest that this website is not topically related (e.g., links to the Internet Explorer website are often included in unrelated websites). The indirect links can also be classified according to a set of topics and links with very different topics may be excluded or be assigned a low weight.

The three types of user profiles discussed above are generally complimentary to one another since different profiles delineate a user's interests and preferences from different vantage points. However, this does not mean that one type of user profile, e.g., category-based profile, is incapable of playing a role that is typically played by another type of user profile. By way of example, a preferred URL or host in a link-based profile is often associated with a specific topic, e.g., finance.yahoo.com is a URL focusing on financial news. Therefore, what is achieved by a link-based profile that comprises a list of preferred URLs or hosts to characterize a user's preference may also be achievable, at least in part, by a category-based profile that has a set of categories that cover the same topics covered by preferred URLs or hosts.

It is a non-trivial operation to construct various types of user profiles that can be stored in the data structures shown in FIGS. 3-5 based on the user information listed in FIG. 2. Given a document identified (e.g., viewed) by a user, different terms in the document may have different importance in revealing the topic of the document. Some terms, e.g., the document's title, may be extremely important, while other terms may have little importance. For example, many documents contain navigational links, copyright statements, disclaimers and other text that may not be related to the topic of the document. How to efficiently select appropriate documents, content from those documents and terms from within the content is a challenging topic in computational linguistics. Additionally, it is preferred to minimize the volume of user information processed, so as to make the process of user profile construction computationally efficient. Skipping less important terms in a document helps in accurately matching a document with a user's interest.

Paragraph sampling (described below with reference to FIG. 6) is a procedure for automatically extracting content from a document that may be relevant to a user. An important observation behind this procedure is that less relevant content in a document, such as navigational links, copyright statements, disclaimer, etc., tend to be relatively short segments of text. In one embodiment, paragraph sampling looks for the paragraphs of greatest length in a document, processing the paragraphs in order of decreasing length until the length of a paragraph is below a predefined threshold. The paragraph sampling procedure optionally selects up to a certain maximum amount of content from each processed paragraph. If few paragraphs of suitable length are found in a document, the procedure falls back to extracting text from other parts of the document, such as anchor text and ALT tags.

Figure 6:
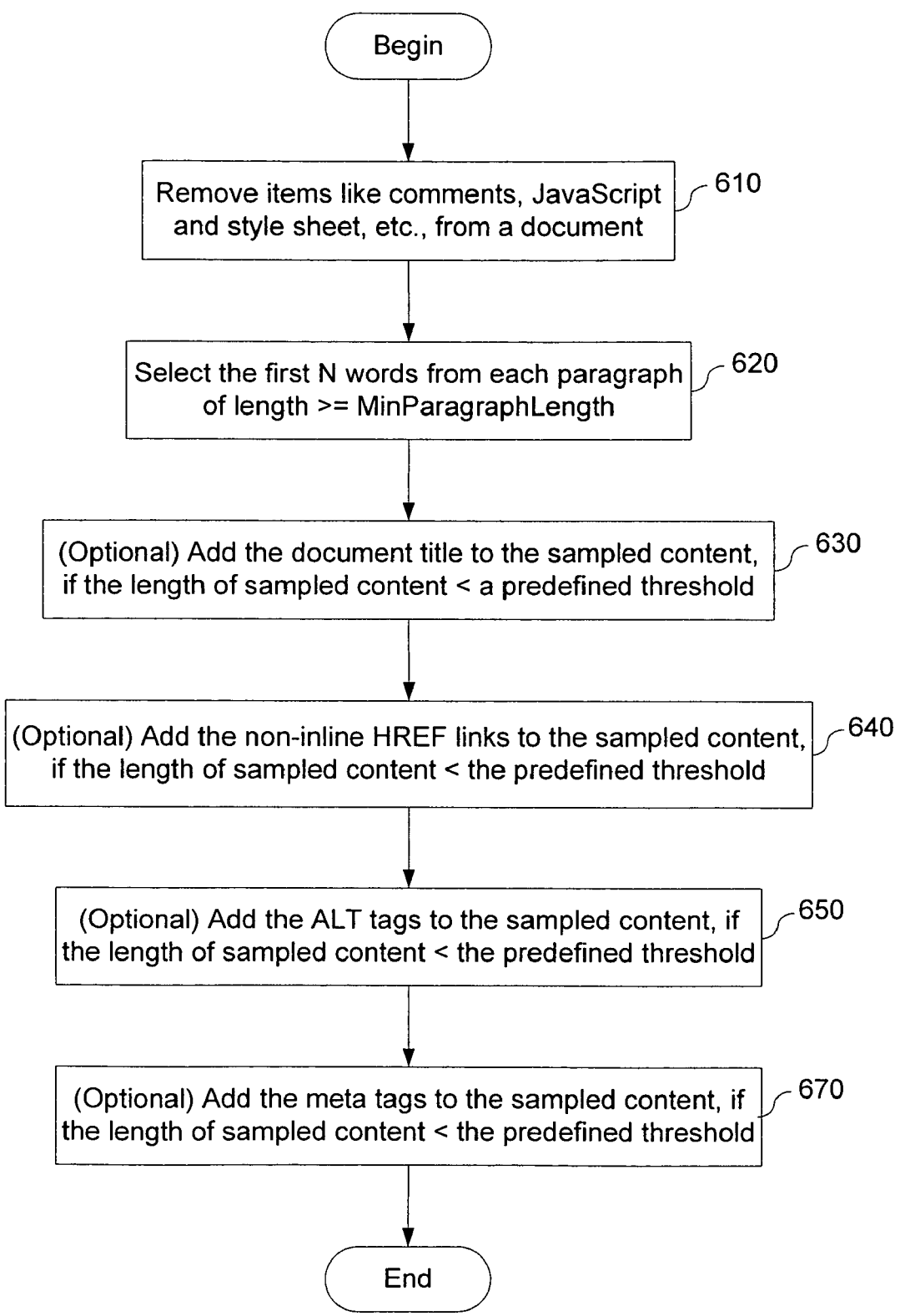
FIG. 6 is a flowchart illustrating paragraph sampling.

FIG. 6 is a flowchart illustrating the major steps of paragraph sampling. Paragraph sampling begins with the step 610 of removing predefined items, such as comments, JavaScript and style sheets, etc., from a document. These items are removed because they are usually related to visual aspects of the document when rendered on a browser and are unlikely to be relevant to the document's topic. Following that, the procedure may select the first N words (or M sentences) at step 620 from each paragraph whose length is greater than a threshold value, MinParagraphLength, as sampled content. In one embodiment, the values of N and M are chosen to be 100 and 5, respectively. Other values may be used in other embodiments.

In order to reduce the computational and storage load associated with the paragraph sampling procedure, the procedure may impose a maximum limit, e.g., 1000 words, on the sampled content from each document. In one embodiment, the paragraph sampling procedure first organizes all the paragraphs in a document in length decreasing order, and then starts the sampling process with a paragraph of maximum length. It is noted that the beginning and end of a paragraph depend on the appearance of the paragraph in a browser, not on the presence of uninterrupted a text string in the HTML representation of the paragraph. For this reason, certain HTML commands, such as commands for inline links and for bold text, are ignored when determining paragraph boundaries. In some embodiments, the paragraph sampling procedure screens the first N words (or M sentences) so as to filter out those sentences including boilerplate terms like "Terms of Service" or "Best viewed", because such sentences are usually deemed irrelevant to the document's topic.

Before sampling a paragraph whose length is above the threshold value, the procedure may stop sampling content from the document if the number of words in the sampled content has reached the maximum word limit. If the maximum word limit has not been reached after processing all paragraphs of length greater than the threshold, optional steps 630, 640, 650 and 670 are performed. In particular, the procedure adds the document title (630), the non-inline HREF links (640), the ALT tags (650) and the meta tags (670) to the sampled content until it reaches the maximum word limit.

Once the documents identified by a user have been scanned, the sampled content can be used for identifying a list of most important (or unimportant) terms through context analysis. Context analysis attempts to learn context terms that predict the most important (or unimportant) terms in a set of identified documents. Specifically, it looks for prefix patterns, postfix patterns, and a combination of both. For example, an expression "x's home page" may identify the term "x" as an important term for a user and therefore the postfix pattern "* home page" can be used to predict the location of an important term in a document, where the asterisk "*" represents any term that fits this postfix pattern. In general, the patterns identified by context analysis usually consist of m terms before an important (or unimportant) term and n terms after the important (or unimportant) term, where both m and n are greater than or equal to 0 and at least one of them is greater than 0. Typically, m and n are less than 5, and when non-zero are preferably between 1 and 3. Depending on its appearance frequency, a pattern may have an associated weight that indicates how important (or unimportant) the term recognized by the pattern is expected to be.

Figure 7A:
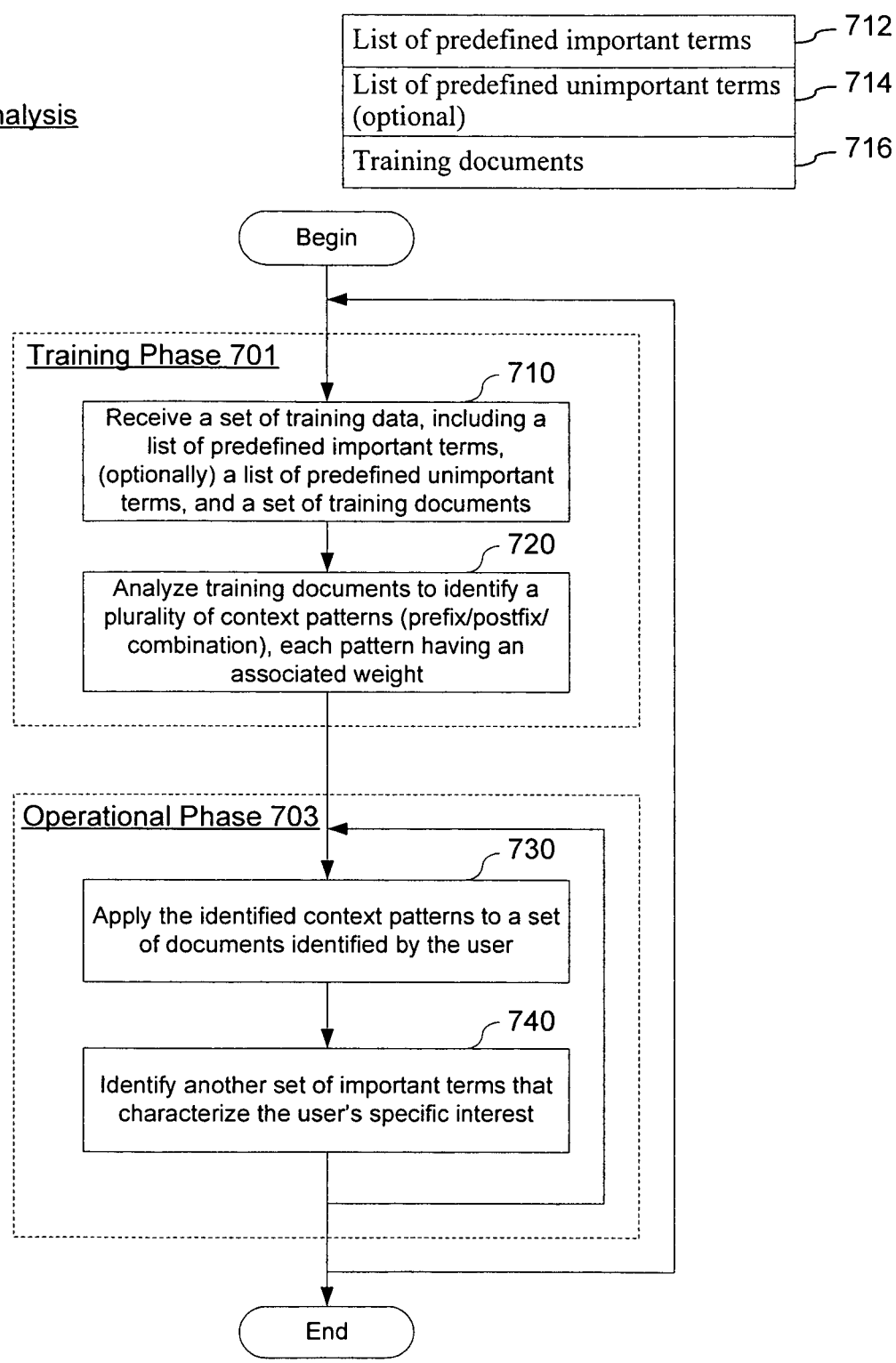
FIG. 7A is a flowchart illustrating context analysis.

According to one embodiment of the present invention (FIG. 7A), context analysis has two distinct phases, a training phase 701 and an operational phase 703. The training phase 701 receives and utilizes a list of predefined important terms 712, an optional list of predefined unimportant terms 714, and a set of training documents (step 710). In some embodiments, the list of predefined unimportant terms is not used. The source of the lists 712, 714 is not critical. In some embodiments, these lists 712, 714 are generated by extracting words or terms from a set of documents (e.g., a set of several thousand web pages of high page rank) in accordance with a set of rules, and then editing them to remove terms that in the opinion of the editor do not belong in the lists. The source of the training documents is also not critical. In some embodiments, the training documents comprise a randomly or pseudo-randomly selected set of documents already known to the search engine. In other embodiments, the training documents are selected from a database of documents in the search engine in accordance with predefined criteria.

During the training phase 701, the training documents are processed (step 720), using the lists of predefined important and unimportant terms, so as to identify a plurality of context patterns (e.g., prefix patterns, postfix patterns, and prefix-postfix patterns) and to associate a weight with each identified context pattern. During the operational phase 703, the context patterns are applied to documents identified by the user (step 730) to identify a set of important terms (step 740) that characterize the user's specific interests and preferences. Learning and delineating a user's interests and preferences is usually an ongoing process. Therefore, the operational phase 703 may be repeated to update the set of important terms that have been captured previously. This may be done each time a user accesses a document, according to a predetermined schedule, at times determined in accordance with specified criteria, or otherwise from time to time. Similarly, the training phase 701 may also be repeated to discover new sets of context patterns and to recalibrate the weights associated with the identified context patterns.

Below is a segment of pseudo code that exemplifies the training phase:

```
For each document in the set {
    For each important term in the document {
        For m = 0 to MaxPrefix {
            For n = 0 to MaxPostfix {
                Extract the m words before the important
                term and the n words after the important
                term as s;
                Add 1 to ImportantContext(m,n,s);
            }
        }
    }
    For each unimportant term in the document {
        For m = 0 to MaxPrefix {
            For n = 0 to MaxPostfix {
                Extract the m words before the
                unimportant term and the n words after
                the unimportant term as s;
                Add 1 to UnimportantContext(m,n,s);
            }
        }
```

```
        }
    }
    For m = 0 to MaxPrefix {
        For n = 0 to MaxPostfix {
            For each value of s {
                Set the weight for s to a function of
                ImportantContext(m,n,s), and
                UnimportantContext(m,n,s);
            }
        }
    }
```

In the pseudo code above, the expressions refers to a prefix pattern (n=0), a postfix pattern (m=0) or a combination of both (m>0 & n>0). Each occurrence of a specific pattern is registered at one of the two multi-dimensional arrays, ImportantContext(m,n,s) or UnimportantContext(m,n,s). The weight of a prefix, postfix or combination pattern is set higher if this pattern identifies more important terms and fewer unimportant terms and vice versa. Note that it is possible that a same pattern may be associated with both important and unimportant terms. For example, the postfix expression "* operating system" may be used in the training documents 716 in conjunction with terms in the list of predefined important terms 712 and also used in conjunction with terms in the list of predefined unimportant terms 714. In this situation, the weight associated with the postfix pattern "* operating system" (represented by the expression Weight(1,0, "operating system")) will take into account the number of times the postfix expression is used in conjunction with terms in the list of predefined important terms as well as the number of times the postfix expression is used in conjunction with terms in the list of predefined unimportant terms. One possible formula to determine the weight of a context patterns is:

Weight($m,n,s$)=Log(ImportantContext($m,n,s$)+1)−Log(UnimportantContext($m,n,s$)+1).

Other weight determination formulas may be used in other embodiments.

Figure 7B:
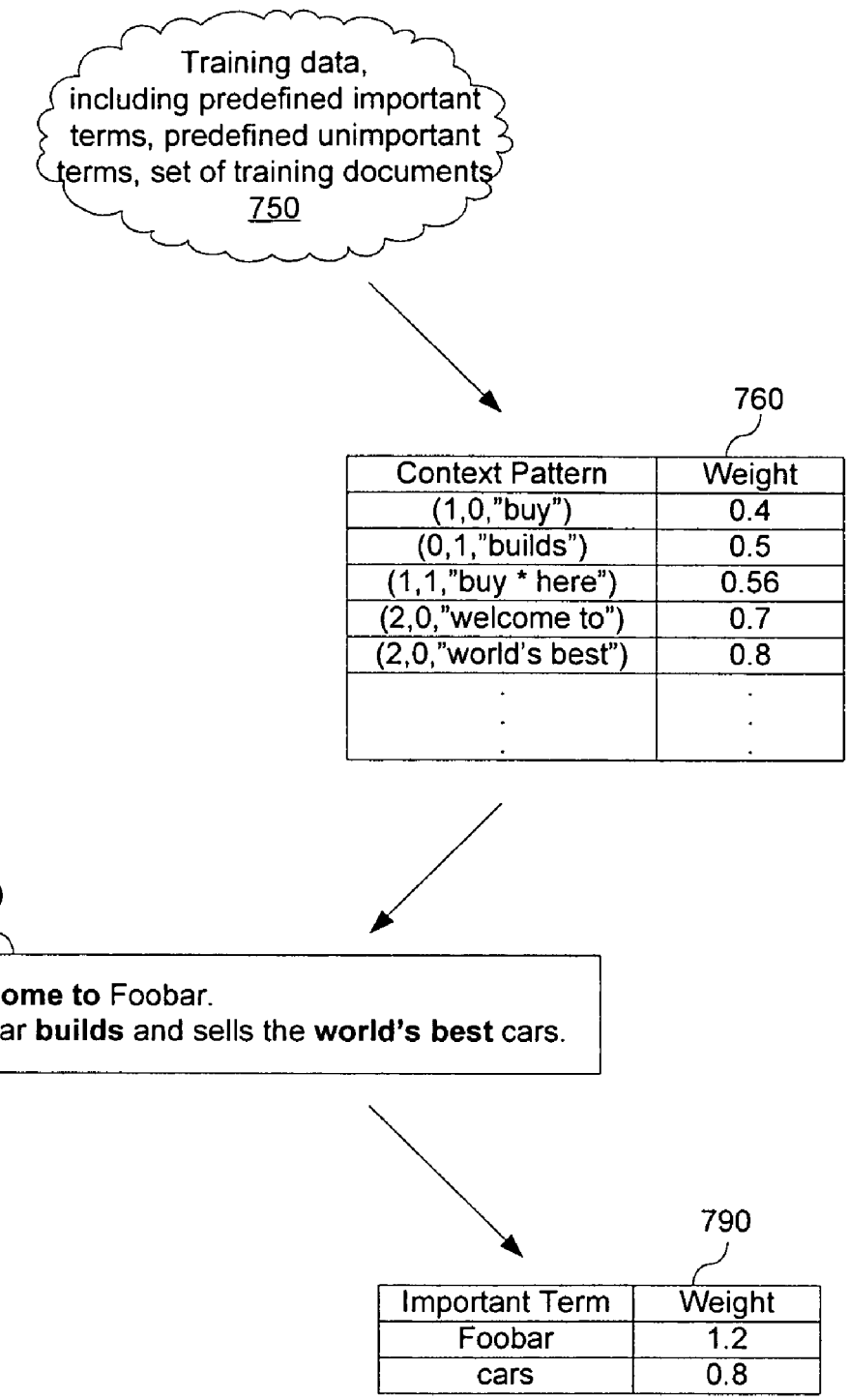
FIG. 7B depicts a process of identifying important terms using context analysis.

In the second phase of the context analysis process, the weighted context patterns are used to identify important terms in one or more documents identified by the user. Referring to FIG. 7B, in the first phase a computer system receives training data 750 and creates a set of context patterns 760, each context pattern having an associated weight. The computer system then applies the set of context patterns 760 to a document 780. In FIG. 7B, previously identified context patterns found within the document 780 are highlighted. Terms 790 associated with the context patterns are identified and each such term receives a weight based on the weights associated with the context patterns. For example, the term "Foobar" appears in the document twice, in association with two different patterns, the prefix pattern "Welcome to *" and the postfix pattern "* builds", and the weight 1.2 assigned to "Foobar" is the sum of the two patterns' weights, 0.7 and 0.5. The other identified term "cars" has a weight of 0.8 because the matching prefix pattern "world's best *" has a weight of 0.8. In some embodiments the weight for each term is computed using a log transform, where the final weight is equal to log(initial weight+1). It is possible that the two terms "Foobar" and "cars" may not be in the training data 750 and may have never been encountered by the user before. Nevertheless, the context analysis method described above identifies these terms and adds them to the user's term-based profile. Thus, context analysis can be used to discover terms associated with a user's interests and preferences even when those terms are not included in a predefined database of terms.

As noted, the output of context analysis can be used directly in constructing a user's term-based profile. Additionally, it may be useful in building other types of user profiles, such as a user's category-based profile. For example, a set of weighted terms can be analyzed and classified into a plurality of categories covering different topics, and those categories can be added to a user's category-based profile.

After executing the context analysis on a set of documents identified by or for a user, the resulting set of terms and weights may occupy a larger amount of storage than allocated for each user's term-based profile. Also, the set of terms and corresponding weights may include some terms with weights much, much smaller than other terms within the set. Therefore, in some embodiments, at the conclusion of the context analysis, the set of terms and weights is pruned by removing terms having the lowest weights (A) so that the total amount of storage occupied by the term-based profile meets predefined limits, and/or (B) so as to remove terms whose weights are so low, or terms that correspond to older items, as defined by predefined criteria, that the terms are deemed to be not indicative of the user's search preferences and interests. In some embodiments, similar pruning criteria and techniques are also applied to the category-based profile and/or the link-based profile.

As discussed above, a category-based profile can be created based on the information described in reference to FIG. 2. For example, the query terms previously submitted can be associated with particular categories of information. A user profile engine could analyze the previous search queries submitted by a user to determine particular categories of information that the user might be interested in and their respective weights. Such a user profile engine could analyze any of the sources of information described in reference to FIG. 2.

In some embodiments, a user's profile is updated each time the user performs a search and selects at least one document from the search results to download or view. In some embodiments, the search engine builds a list of documents identified by the user (e.g., by selecting the documents from search results) over time, and at predefined times (e.g., when the list reaches a predefined length, or a predefined amount of time has elapsed), performs a profile update. When performing an update, new profile data is generated, and the new profile data is merged with the previously generated profile data for the user. In some embodiments, the new profile data is assigned higher importance than the previously generated profile data, thereby enabling the system to quickly adjust a user's profile in accordance with changes in the user's search preferences and interests. For example, the weights of items in the previously generated profile data may be automatically scaled downward prior to merging with the new profile data. In one embodiment, there is a date associated with each item in the profile, and the information in the profile is weighted based on its age, with older items receiving a lower weight than when they were new. In other embodiments, the new profile data is not assigned high importance than the previously generated profile data.

The paragraph sampling and context analysis methods may be used independently or in combination. When used in combination, the output of the paragraph sampling is used as input to the context analysis method.

It is further noted that the above-described methods used for creating user profiles, e.g., paragraph sampling and context analysis, may be also leveraged for determining the relevance of a candidate document to a user's preference. Indeed, the primary mission of a search engine is to identify a series of documents that are most relevant to a user's preference based on the search queries submitted by the user as well as the user's user profile. FIG. 8 illustrates several exemplary data structures that can be used to store information about a document's relevance to a user profile from multiple perspectives. For each candidate document, each identified by a respective DOC_ID, term-based document information table 810 includes multiple pairs of terms and their weights, category-based document information table 830 includes a plurality of categories and associated weights, and link-based document information table 850 includes a set of links and corresponding weights.

The rightmost column of each of the three tables (810, 830 and 850) stores the rank (i.e., a computed score) of a document when the document is evaluated using one specific type of user profile. A user profile rank can be determined by combining the weights of the items associated with a document. For instance, a category-based or topic-based profile rank may be computed as follows. A user may prefer documents about science with a weight of 0.6, while he dislikes documents about business with a weight of −0.2. Thus, when a science document matches a search query, it will be weighted higher than a business document. In general, the document topic classification may not be exclusive. A candidate document may be classified as being a science document with probability of 0.8 and a business document with probability of 0.4. A link-based profile rank may be computed based on the relative weights allocated to a user's URL, host, domain, etc., preferences in the link-based profile. In one embodiment, term-based profile rank can be determined using known techniques, such as the term frequency-inverse document frequency (TF-IDF). The term frequency of a term is a function of the number of times the term appears in a document. The inverse document frequency is an inverse function of the number of documents in which the term appears within a collection of documents. For example, very common terms like "the" occur in many documents and consequently as assigned a relatively low inverse document frequency.

When a search engine generates search results in response to a search query, a candidate document D that satisfies the query is assigned a query score, QueryScore, in accordance with the search query. This query score is then modulated by document D's page rank, PageRank, to generate a generic score, GenericScore, that is expressed as GenericScore=QueryScore*PageRank.

This generic score may not appropriately reflect document D's importance to a particular user U if the user's interests or preferences are dramatically different from that of the random surfer. The relevance of document D to user U can be accurately characterized by a set of profile ranks, based on the correlation between document D's content and user U's term-based profile, herein called the TermScore, the correlation between one or more categories associated with document D and user U's category-based profile, herein called the CategoryScore, and the correlation between the URL and/or host of document D and user U's link-based profile, herein called the LinkScore. Therefore, document D may be assigned a personalized rank that is a function of both the document's generic score and the user profile scores. In one embodiment, this personalized score can be expressed as:

PersonalizedScore=GenericScore*(TermScore+CategoryScore+LinkScore).

Figure 9A:
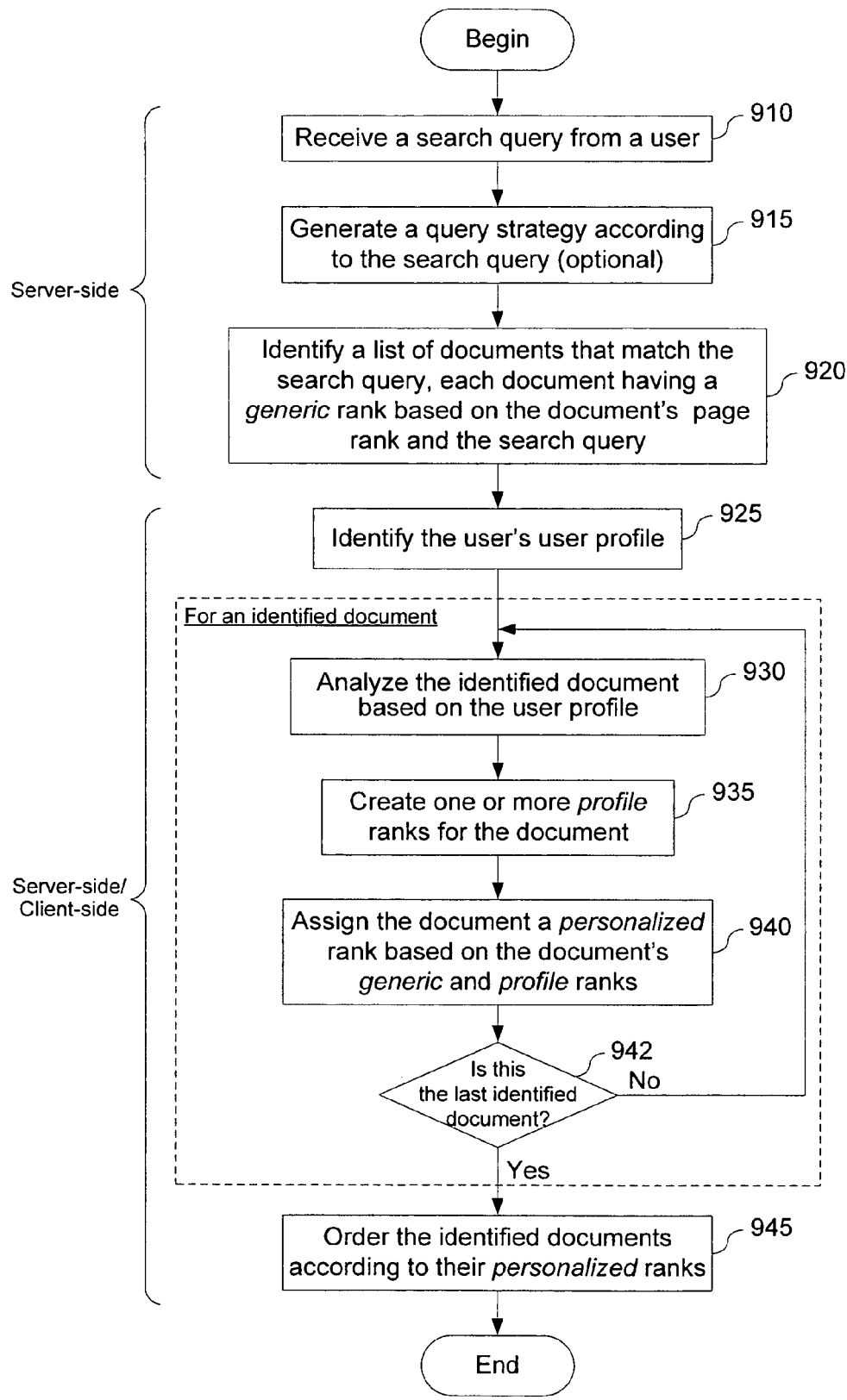
FIG. 9A is a flowchart illustrating a personalized web search process according to one embodiment.
Figure 9B:
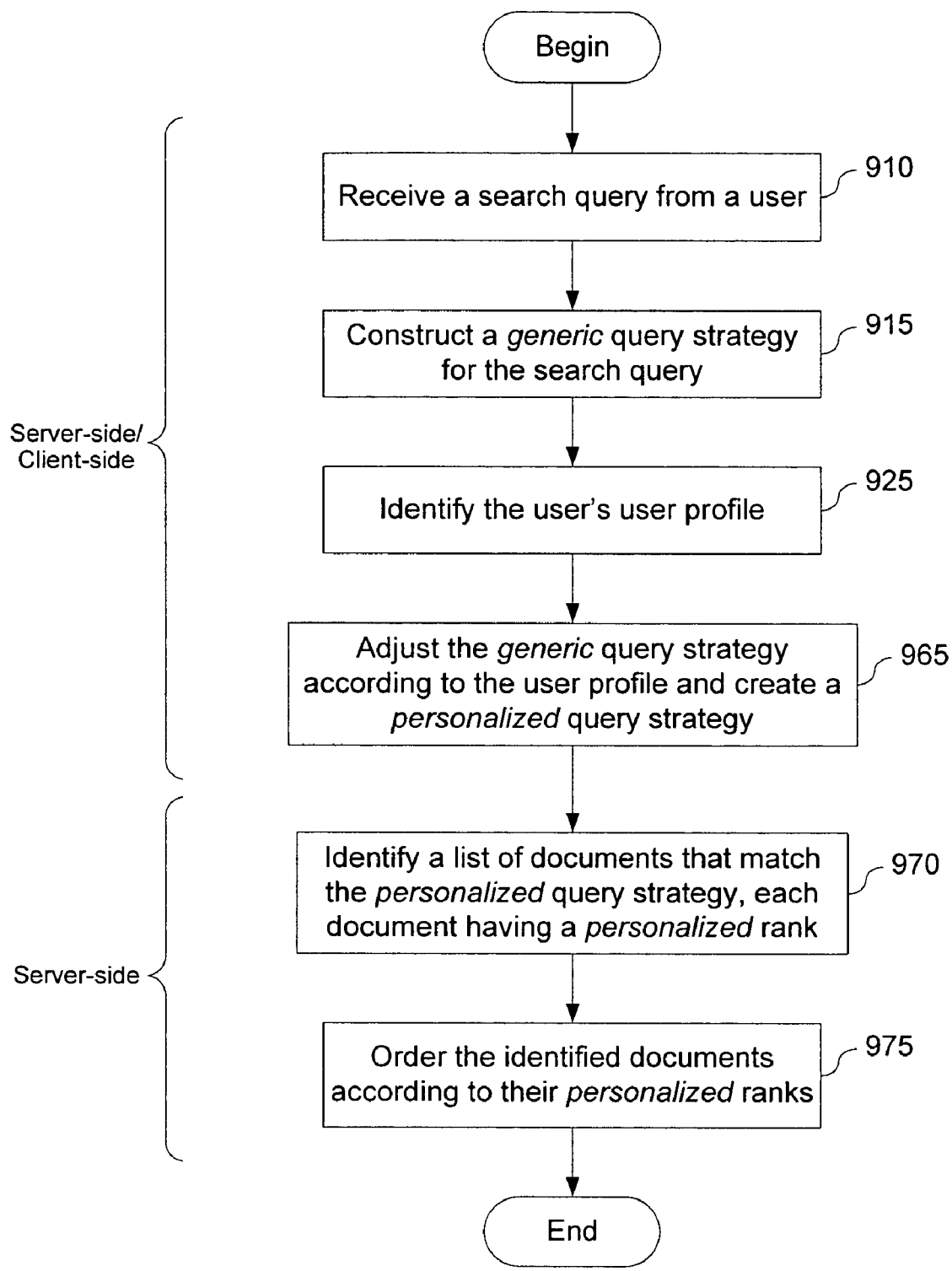
FIG. 9B is a flowchart illustrating a personalized web search process according to another embodiment.

FIGS. 9A and 9B represent two embodiments, both implemented in a client-server network environment such as the network environment 100 shown in FIG. 1. In the embodiment shown in FIG. 9A, the search engine 104 receives a search query from a client 102 at step 910 that is submitted by a particular user. In response, the search engine 104 may optionally generate a query strategy at step 915 (e.g., the search query is normalized so as to be in proper form for further processing, and/or the search query may be modified in accordance with predefined criteria so as to automatically broaden or narrow the scope of the search query). At step 920, the search engine 104 submits the search query (or the query strategy, if one is generated) to the content server 106. The content server identifies a list of documents that match the search query at step 920, each document having a generic score that depends on the document's page rank and the search query. In general, all the three operations (steps 910, 915 and 920) are conducted by the search engine system 107, which is on the server side of the network environment 100. There are two options on where to implement the operations following these first three steps.

In some embodiments that employ a server-side implementation, the user's identification number is embedded in the search query. Based on the user's identification number, the user profile server 108 identifies the user's user profile at step 925. Starting from step 930, the user profile server 108 or the search engine 104 analyzes each document identified at step 920 to determine its relevance to the user's profile, creates a profile score for the identified document at step 935 and then assigns the document a personalized score that is a function of the document's generic and profile scores at step 940. At step 942, the user profile server 108 or the search engine 104 checks whether this the last one in the list of identified documents. If no, the system processes the next document in the list. Otherwise, the list of documents are re-ordered according to their personalized scores and then sent to the corresponding client from which the user submitted the search query.

Embodiments using a client-side implementation are similar to the server-side implementation, except that after step 920, the identified documents are sent to the corresponding client from which the user submitted the query. This client stores the user's user profile and it is responsible for re-ordering the documents based upon the user profile. Therefore, this client-side implementation may reduce the server's workload. Further, since there is no privacy concern with the client-side implementation, a user may be more willing to provide private information to customize the search results. However, a significant limitation to the client-side implementation is that only a limited number of documents, e.g., the top 50 documents (as determined using the generic rank), may be sent to a client for re-ordering due to limited network bandwidth. In contrast, the server-side implementation may be able to apply a user's profile to a much larger number of documents, e.g., 1000, that match the search query. Therefore, the client-side implementation may deprive a user access to those documents having relatively low generic ranks, but significantly high personalized ranks.

FIG. 9B illustrates another embodiment. Unlike the embodiment depicted in FIG. 9A, where the search query is not personalized before submitting the search query to the search engine 104, a generic query strategy is adjusted (step 965) according to the user's user profile to create a personalized query strategy. For example, relevant terms from the user profile may be added to the search query with associated weights. The creation of the personalized query strategy can be performed either on the client side or on the server side of the system. This embodiment avoids the network bandwidth restriction facing the previous embodiment. Finally, the search engine 104 submits the personalized query strategy to the content server 106 (step 970), and therefore the search results returned by the content server have already been ordered by the documents' personalized ranks (step 975).

The profiles of a group of users with related interests may be combined together to form a group profile, or a single profile may be formed based on the documents identified by the users in the group. For instance, several family members may use the same computer to submit search queries to a search engine. If the computer is tagged with a single user identifier by the search engine, the "user" will be the entire family of users, and the user profile will be represent a combination or mixture of the search preferences of the various family members. An individual user in the group may optionally have a separate user profile that differentiates this user from other group members. In operation, the search results for a user in the group are ranked according to the group profile, or according to the group profile and the user's user profile when the user also has a separate user profile.

It is possible that a user may switch his interests so dramatically that his new interests and preferences bear little resemblance to his user profile, or a user may be temporarily interested in a new topic. In this case, personalized search results produced according to the embodiments depicted in FIGS. 9A and 9B may be less favorable than search results ranked in accordance with the generic ranks of the documents in the search results. Additionally, the search results provided to a user may not include new websites among the top listed documents because the user's profile tends to increase the weight of older websites which the user has visited (i.e., older websites from which the user has viewed or downloaded web pages) in the past.

To reduce the impact caused by a change in a user's preferences and interests, the personalized search results may be merged with the generic search results. In one embodiment, the generic search results and personalized search results are interleaved, with the odd positions (e.g., 1, 3, 5, etc.) of a search results list reserved for generic search results and the even positions (e.g., 2, 4, 6, etc.) reserved for personalized search results, or vice versa. Preferably, the items in the generic search results will not duplicate the items listed in the personalized search results, and vice versa. More generally, generic search results are intermixed or interleaved with personalized search results, so that the items in the search results presented to the user include both generic and personalized search results.

In another embodiment, the personalized ranks and generic ranks are further weighted by a user profile's confidence level. The confidence level takes into account factors such as how much information has been acquired about the user, how close the current search query matches the user's profile, how old the user profile is, etc. If only a very short history of the user is available, the user's profile may be assigned a correspondingly low confidence value. The final score of an identified document can be determined as:

FinalScore=ProfileScore*ProfileConfidence+GenericScore*(1−ProfileConfidence).

When intermixing generic and personalized results, the fraction of personalized results may be adjusted based on the profile confidence, for example using only one personalized result when the confidence is low.

Sometimes, multiple users may share a machine, e.g., in a public library. These users may have different interests and preferences. In one embodiment, a user may explicitly login to the service so the system knows his identity. Alternatively, different users can be automatically recognized based on the items they access or other characteristics of their access patterns. For example, different users may move the mouse in different ways, type differently, and use different applications and features of those applications. Based on a corpus of events on a client and/or server, it is possible to create a model for identifying users, and for then using that identification to select an appropriate "user" profile. In such circumstances, the "user" may actually be a group of people having somewhat similar computer usage patterns, interests and the like.

Figure 10:
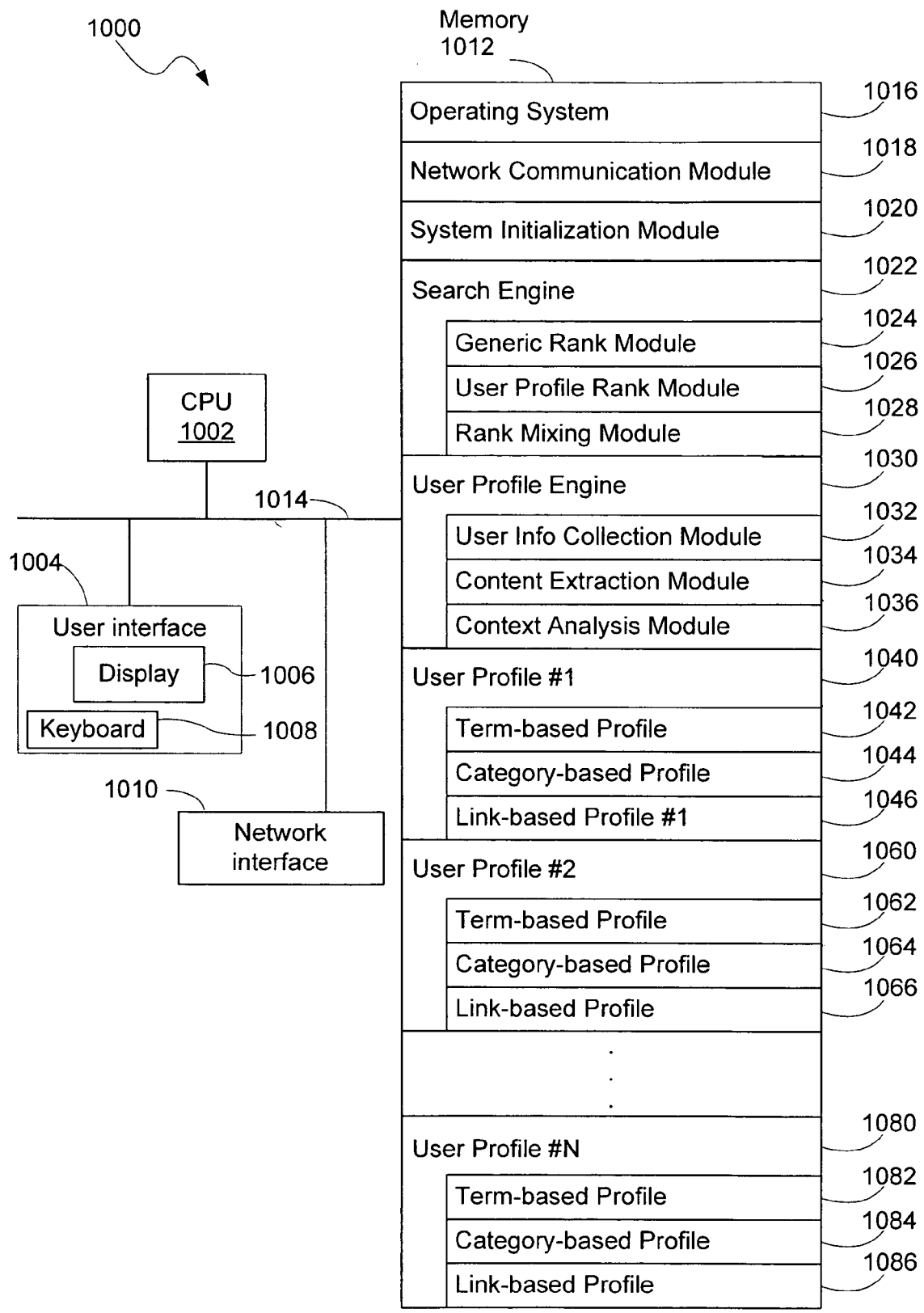
FIG. 10 is a block diagram of a personalized search engine.

Referring to FIG. 10, a personalized search engine system 1000 typically includes one or more processing units (CPU's) 1002, one or more network or other communications interfaces 1010, memory 1012, and one or more communication buses 1014 for interconnecting these components. The system 1000 may optionally include a user interface 1004, for instance a display 1006 and a keyboard 1008. Memory 1012 may include high speed random access memory and may also include non-volatile memory, such as one or more magnetic disk storage devices. Memory 1012 may include mass storage that is remotely located from the central processing unit(s) 1002. The memory 1012 preferably stores:

- an operating system 1016 that includes procedures for handling various basic system services and for performing hardware dependent tasks;
- a network communication module 1018 that is used for connecting the system 1000 to other servers or computers via one or more communication networks (wired or wireless), such as the Internet, other wide area networks, local area networks, metropolitan area networks, and so on;
- a system initialization module 1020 that initializes other modules and data structures stored in memory 1012 required for the appropriate operation of system 1000;
- a search engine 1022 for processing a search query, identifying and ordering search results according to the search query and a user's profile;
- a user profile engine 1030 for gathering and processing user information, such as the user information identified in FIG. 2, and creating and updating a user's user profile that characterizes the user's search preferences and interests; and
- data structures 1040, 1060 and 1080 for storing a plurality of user profiles.

The search engine 1022 may further comprise:

- a generic rank module (or instructions) 1024 for processing a search query submitted by a user, identifying a list of documents matching the query and assigning each identified document a generic rank without reference to user specific information;
- a user profile rank module (or instructions) 1026 for correlating each of a plurality of documents identified by the generic rank module 1024 with the user's user profile and assigning the document a profile rank indicating the relevance of the document to the user's search preferences and interests; and
- a rank mixing module (or instructions) 1028 for combining the generic rank and the profile rank of an identified document into a personalized rank and re-ordering the list of documents according to their personalized ranks.

In some embodiments, these modules 1024, 1026, 1028 may be implemented within a single procedure or in a set of procedures that reside within a single software module.

The user profile engine 1030 may further comprise:

- a user information collection module 1032 for collecting and assorting various user information listed in FIG. 2;

a document content extraction module 1034 for selecting and extracting content from the documents identified by the user, to identify content relevant to the user's interests, using techniques such as paragraph sampling (as discussed above); and a context analysis module 1036 for analyzing the content extracted by the document extraction module 1034 so as to identify terms that characterize a user's search preferences.

Each data structure hosting a user profile may further comprise:

a data structure 1042, 1062 or 1082 for storing a term-based user profile;

a data structure 1044, 1064 or 1084 for storing a category-based user profile; and a data structure 1046, 1066 or 1086 for storing a link-based user profile.

Ordering Placed Content in Accordance with a User Profile

Placed content may be displayed to users of search services, email services, and a variety of other services provided via the Internet or other wide area networks. The following is a description of a system and method for ordering the placed content (e.g., within a browser window or other application window viewed by a user) so as to (A) maximize or at least improve the chances that the user will be interested in viewing the placed content, or (B) maximize or at least improve the revenue stream to a provider of the placed content, or (C) optimize or at least improve a metric associated with the delivery and ordering of the placed content. The system and method will first be described with respect to delivering placed content to users of a search engine, after which applications of the system and method to other internet services will be described.

When search results are returned to a user in response to a search query, often times certain placed content is returned as well. Placed content is usually in the form of advertising, but could be any type of content related to the search query or to a document being sent to the user. Although the following description uses advertising content for the sake of illustration, any type of content where content providers compete or pay for placement is contemplated by some embodiments of the invention. The user's search query can be run against a repository of advertisements (ads) at the same time the search query is being run against a document repository. The ads returned from the search against the repository of ads (e.g., ads whose keywords match at least one term of the search query) are typically ordered by a score for each ad. The score is based on a click through rate (CTR) multiplied by a bid (e.g., a bid price). The ads having the highest scores are presented to the user. In some embodiments, a content provider may provide multiple, similar ads associated with the same bid. In this case, the various ads may be presented to users in a random fashion, or any other order. For instance, if a content provider provides a group of three ads to which a single bid on the term "hat" applies, whenever the group of ads has a high enough score to be included in a set of search results, one of the three ads in the group is selected (e.g., randomly, or in round robin order) and presented to the user.

Advertisers may bid on different keywords or concepts through, for example, an auction in which advertisers place bids on certain search terms or phrases. For example, a maker of sails for sailboats may bid on the keyword "spinnaker" such that when that term appears in a search query, the advertiser's ad will appear in the list of potential ads to be presented to the user. The ad will be presented to the user if the ad's score is high enough. As mentioned above, the score is based on the CTR times the bid. An advertiser then pays for the ad based on its bid and based on the number of click throughs for the ad for a particular accounting period (e.g., the bid times the number of click throughs). In some embodiments, the auction may have characteristics of a "Dutch auction," in which case the amount paid by the advertiser for a particular ad may be a modified or reduced bid multiplied by the number of click throughs for the particular accounting period.

Improving an ad's CTR is one way to raise the score of the ad. Improving the CTR could be achieved, for example, by presenting an ad which appeals to users more than other ads. Alternatively, the advertiser may choose to increase his or her bid for a keyword or phrase associated with the ad in order to raise the ad's score. And, of course, the advertiser could both improve the CTR of the ad and increase its bid for a keyword associated with the ad. In some embodiments, the CTR for an ad is equal to the number of clicks on the ad divided by the number of impressions, that is, the number of times the ad is presented to users. Ads which are new do not typically have useful CTRs, because the number of impressions of the ad is too low for the value of the CTR to be a reliable indication of the ad's attractiveness to users. In such instances (e.g., when an ad has less than one thousand impressions) an initial CTR is provided by the system. The initial CTR for an ad may be a default value, such as an average CTR value. Alternately, the initial CTR may be selected based on the CTRs of other ads by the same advertiser, or may be based on the CTRs of some other set of ads having a defined relationship to the ad in question.

Figure 11:
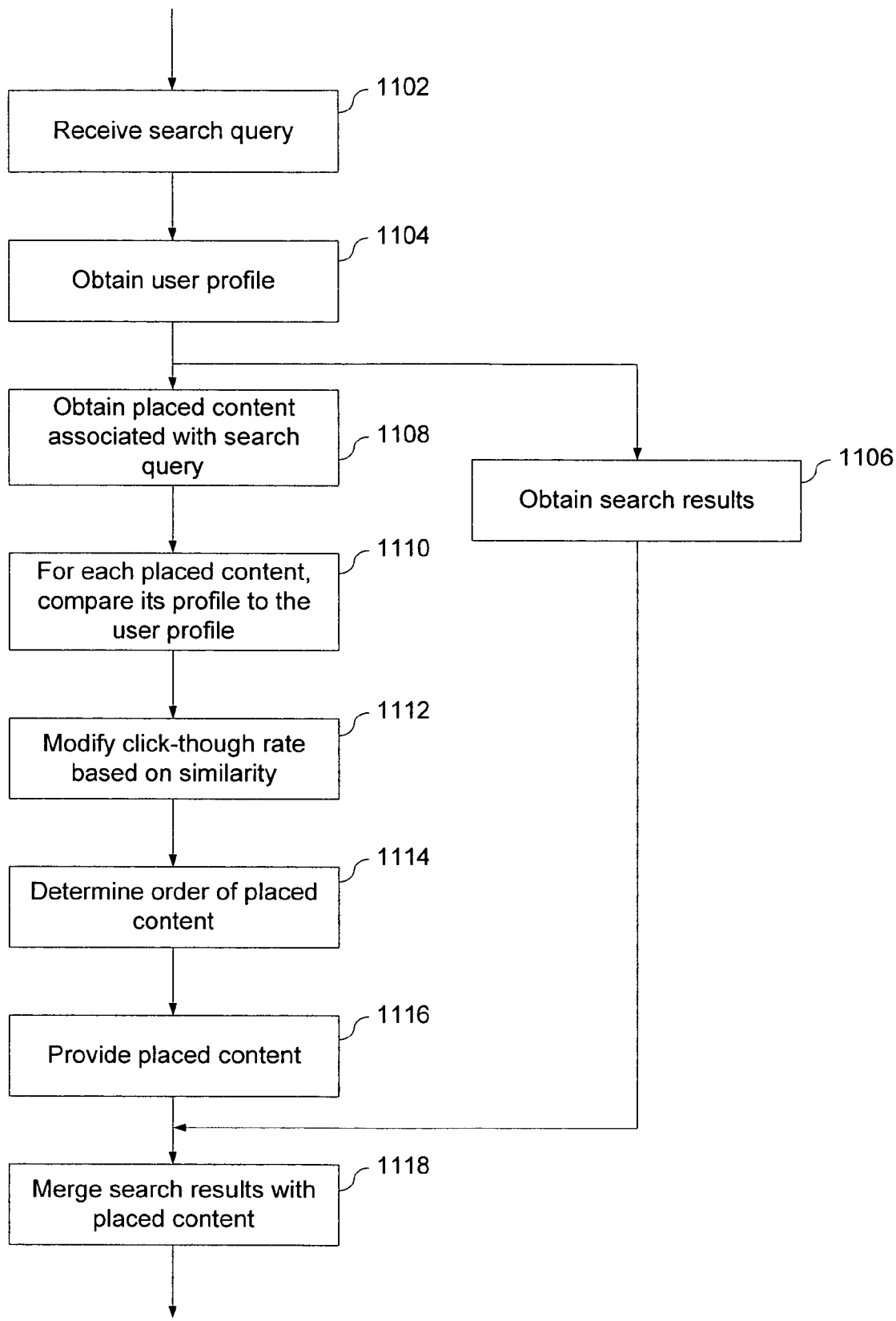
FIG. 11 is a flowchart illustrating a personalized placed content process according to an embodiment of the invention.

It would be desirable to increase the likelihood that the user is presented with ads that are of interest to the user. Accordingly, ads which are in some way related to the user's profile are better candidates for presentation. One way to do this is to modify the ad's score based on the similarity of the ad to the user's profile. Referring back the broader term, "placed content," FIG. 11 illustrates one embodiment for providing placed content with search results.

Initially a search query is received (1102) at a search engine, for example. The search query may identify the user submitting the search query, for instance by including an identifier of the client computer or client process submitting the search query. Alternately, the identity of the user may be known due to a prior login to a service, or a cookie or other suitable method. The user's profile is obtained (1104) from a database or repository of user profiles. In one embodiment, the user's profile is a category profile. While the following description uses the category profile, one of ordinary skill in the art will readily recognize that the concepts herein can applied to other types of profiles. While the search engine processes the search query so as to obtain search results (1106), a placed content server identifies one or more placed content items (herein called potential placed content) that match or are relevant to the search query (1108). In other embodiments, the placed content server may provide the placed content based on what document is being provided to the user, be it as a result of a search or a specifically requested document. In that embodiment the placed content server determines which of the placed content is relevant to the document being presented to the user. In other embodiments, the placed content server may provide the placed content based on the contents of the one or more documents being presented as the search results.

Each potential placed content has a profile associated with it. In one embodiment, the profile is in the form of a category profile containing pairs of categories and weights. The profile could be created by, for example, extracting key terms from the placed content and associating them with various categories and assigning respective weights.

For each potential placed content, a profile of the potential placed content is compared to the user's profile (1110). The user's profile is compared to the placed content profile to obtain a similarity score. The similarity score is then used to modify the placed content's ranking. If one considers each of the profiles as a vector, then one of ordinary skill in the art will recognize various mathematical ways to compare the profiles. For example, the similarity score could be determined by taking each category in the user's profile and determining a mathematical distance between it and each category of the placed content's profile and then multiplying by the respective weights. One way to represent this calculation is by the following formula:

$$\text{similarity score} = \sum_{i=0}^{n-1} \sum_{j=0}^{m-1} \text{distance}(\text{category}(i), \text{category}(j)) * \text{weight}(i) * \text{weight}(j)$$

where n represents the number of categories in the user's profile and m represents the number of categories in the placed content's profile; distance(category(i), category(j)) represents a mathematical distance between category(i) and category(j); and weight(i) and weights) represent the weights associating with category(i) and category(j), respectively.

Another, more general, way to represent computation of the similarity score is:

$$\text{similarity score} = \text{function (user profile, content profile)}$$

where "function" is any suitable function of the user profile and the content profile of a particular placed content item. When the user and content profiles are category profiles, the computation of the similarity score may be represented as:

$$\text{similarity score} = \text{function}(\text{user profile categories, user profile weights,}$$
$$\text{content profile categories, content profile weights})$$

where "function" is any suitable function of the vector of user profile categories and weights and the vector of content profile categories and weights. A somewhat more specific example of a computation of the similarity score, which differs from the double sum computation shown above, is:

$$\text{similarity score} = \sum_i \text{Max}_j(\text{function}(\text{category}(i), \text{category}(j), \text{weight}(i), \text{weight}(j)))$$

where "$\text{Max}_j$" represents the maximum value of the function for all valid values of j, and the "function" is any suitable function of the user and content profile categories and weights.

In some embodiments the similarity score is normalized to a particular range to create a scaling factor. For example, the similarity score may be normalized so as to fall in the inclusive range of 0 to 1, or 0 to 2. Higher similarity scores indicate that the profiles are more closely related than profiles whose comparisons result in lower similarity scores. In some embodiments, the normalized similarity score is used as the scaling factor. In other embodiments, the scaling factor is determined by mapping either the similarity score or the normalized similarity score to a corresponding scaling factor in accordance with either a scaling factor mapping function or a scaling factor lookup table.

In one embodiment, a set of N predefined scaling factors (sometimes called subfactors) are stored in a scaling factor lookup table, with each scaling factor corresponding to a respective range of similarity score values. In this exemplary embodiment, N is an integer greater than one, and preferably greater than three. The similarity score for a particular placed content is mapped to a "bin," for example by multiplying or dividing the similarity score by a predefined number, rounding the result up or down to the closest integer to produce a bin number, and then mapping the resulting bin number to a scaling factor by using the bin number as an index into the scaling factor lookup table. The range of scaling factors can vary from one implementation to another.

The use of either a scaling factor mapping function or a scaling factor lookup table permits a great deal of flexibility in relating the similarity score to the scaling factor. For example, one could create a scaling factor mapping function or a scaling factor lookup table that adjusts downward the CTRs of placed content having very low similarity scores as well as placed content having very high similarity scores. In some embodiments, the scaling factor associated with the maximum similarity score is less than the scaling factor associated with a mid-point similarity score, where the mid-point could be either the mean or median of the similarity scores. Alternately, the mid-point can be any identified point between the minimum and maximum similarity scores. In some embodiments, the scaling factor associated with the maximum similarity score is greater than the scaling factor associated with a mid-point similarity score, but is less than the maximum scaling factor associated with a scaling factor mapping function or a scaling factor lookup table. When viewing the scaling factor mapping function for values of the similarity score going from a minimum score to a maximum score, the scaling factor will typically initially increase from a low value associated with the minimum score until it reaches a peak scaling factor value, and will then decrease until the similarity score reaches a maximum value.

In some embodiments, the scaling factor corresponding to a similarity score is determined in accordance with statistical information relating similarity scores to click through rates. In particular, click through rates by users can be statistically correlated to similarity scores for the users and the placed content items. For instance, separate click through rates can be determined for each range in a set of N ranges of similarity scores by collecting data on impressions, click throughs and the similarity scores associated with each impression and click through. Based on those click through rates, a set of N scaling factors can be generated for storing in a scaling factor lookup table. Alternately, the collected statistical information can be used to generate a scaling factor mapping function, for instance by using curve fitting techniques.

In some embodiments, the respective scaling factor for each identified placed content is multiplied by the CTR of the placed content to provide a modified CTR, to reflect the increased likelihood that the user would be interested in the placed content (1112 of FIG. 11). More specifically, the score for each placed content that matches the search query (e.g., by having at least one keyword that matches a term of the search query) is computed as:

$$score = scaling\ factor \times CTR \times bid.$$

The placed content items are then ranked or ordered based on their respective scores (1114) and the placed content items having the highest scores are provided to the user (1116), for example by being sent to a browser application on the user's computer. In some embodiments, the placed content items having the H highest scores (where H is an integer greater one) may be merged (1118) with search results (sometimes called the primary search results) obtained from execution of the search query against a database. For instance, when the placed content comprises ads, one or more of the ads having the highest scores may be displayed above, below and/or to the side of the primary search results.

In some embodiments, the scores for placed content items are based on the similarity scores produced using a user profile and a bid, but are not based on a click through rate. For instance, in some embodiments click through rates for the placed content items may not be available. As a result, in such embodiments action 1112 either does not occur, or is replaced by a different scoring adjustment or scoring computation action.

In some other embodiments, the scores for placed content items are based on the similarity scores produced using a user profile and a click through rate, but not a bid. And in yet other embodiments, the scores for placed content items are based on the similarity scores produced using a user profile, but those scores are not based on either the bid or a click through rate. When the placed content scores take into account a user profile, but not a bid, the ordering of the placed content is optimized or improved with respect to placed content that is likely to be of interest to the user, without regard to potential economic benefits of other orderings of the placed content items.

The system and method described above can also be used in systems other than search engine systems. For instance, in an email system or in virtually any other system for providing services via the Internet or other wide area network that displays a document or other content to a user or subscriber, placed content may be also be selected and displayed to the user. The placed content may be selected based on the keywords associated with the placed content matching the content of a displayed document or set of documents, or it may be based on the other selection criteria. The selected placed content items are then ordered based on similarity of the user profile and profiles of the selected placed content items, as described above.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of personalizing placed content associated with a search query, comprising:
at a server system having one or more processors and memory storing programs executed by the one or more processors:
receiving a search query from a user;
accessing a user profile associated with the user, wherein the user profile is based, at least in part, on query terms in a plurality of previously submitted search queries;
identifying a set of placed content that matches the search query;
assigning a popularity score to each of the set of placed content in accordance with the user profile, a respective bid value for the placed content, and a respective click through rate for the placed content based on multiple user activities, wherein the assigning the popularity score includes:
determining a similarity score between the user profile and a placed content profile associated with the placed content, wherein the similarity score is indicative of a level of similarity between the user profile and the associated placed content profile, and
combining the similarity score with the respective click through rate and the respective bid value to determine the popularity score assigned to the placed content; and
ranking the set of placed content according to their respective popularity scores; and
preparing for display to the user at least a subset of the set of placed content in an order determined by their respective popularity scores.

2. The method of claim 1, wherein the user profile is based, at least in part, on information about the user, including information derived from a set of documents, the set of documents comprising a plurality of documents selected from the set consisting of documents identified by search results from a search engine, documents linked to the documents identified by search results from the search engine, documents linked to the documents accessed by the user, and documents browsed by the user.

3. The method of claim 1, wherein the determining of the similarity score includes
determining a mathematical distance between a user profile vector of the user profile, the user profile vector including first pairs of categories and respective weights, and a placed content profile vector of the placed content, the placed content profile vector including second pairs of categories and respective weights.

4. The method of claim 1, further including associating the similarity score with a scaling factor.

5. The method of claim 1, further including normalizing the similarity score to a particular range to create a scaling factor.

6. The method of claim 4, wherein the assigning the popularity score to each of the set of placed content includes multiplying the scaling factor, the respective click through rate and the respective bid value.

7. The method of claim 6, wherein the scaling factor associated with a maximum similarity score is less than the scaling factor associated with a mid-point similarity score.

8. The method of claim 4, wherein the scaling factor is determined in accordance with statistical information relating similarity scores to click through rates.

9. The method of claim 1, further including providing the placed content as an advertisement.

10. A computer system for personalizing placed content associated with a search query, comprising:
a user profile, based, at least in part, on query terms in a plurality of previously submitted search queries; and
a placed content server, including a plurality of placed content, for identifying a subset of the plurality of placed content that matches a search query and that assigns a popularity score to each of the plurality of placed content in the subset in accordance with the user profile, a respective bid value for the placed content, and a respective click through rate for the placed content based on multiple user activities, and that ranks the subset based on the respective popularity scores of the subset of placed content, and that prepares for display of the subset of the plurality of placed content in an order determined by their respective popularity scores, wherein the popularity score of each piece of placed content is based on a similarity score between the user profile and a placed content profile associated with the placed content, wherein the similarity score is indicative of a level of similarity between the user profile and the associated placed content profile, and wherein the similarity score is combined with the respective click through rate and the respective bid value to determine the popularity score assigned to the placed content.

11. The system of claim 10, wherein the user profile is based, at least in part, on information about the user, including information derived from a set of documents, the set of documents comprising a plurality of documents selected from the set consisting of documents identified by search results from a search engine, documents linked to the documents identified by search results from the search engine, documents linked to the documents accessed by the user, and documents browsed by the user.

12. The system of claim 10, wherein the similarity score is based on a mathematical distance between a user profile vector of the user profile, the user profile vector including first pairs of categories and respective weights, and a placed content profile vector of the placed content, the placed content profile vector including second pairs of categories and respective weights.

13. The system of claim 10, further including a scaling factor associated with the similarity score.

14. The system of claim 13, wherein the scaling factor is determined by normalizing the similarity score to a particular range.

15. The system of claim 13, wherein the popularity score of each piece of placed content in the set of placed content corresponds to the multiplicative product of the respective scaling factor, the respective click through rate and the respective bid value for the placed content.

16. The system of claim 15, wherein the scaling factor associated with a maximum similarity score is less than the scaling factor associated with a mid-point similarity score.

17. The system of claim 13, wherein the scaling factor is based on statistical information relating similarity scores to click through rates.

18. The system of claim 10, wherein the placed content is an advertisement.

19. A computer program product embodied on a computer readable medium, the computer program product comprising one or more programs that are stored on the computer readable medium and that are executable by a computer so as to perform a process, the one or more computer programs of the computer program product comprising:

instructions for receiving a search query from a user;
instructions for accessing a user profile associated with the user, wherein the user profile is based, at least in part, on query terms in a plurality of previously submitted search queries;
instructions for identifying a set of placed content that matches the search query;
instructions for assigning a popularity score to each of the set of placed content in accordance with the user profile, a respective bid value for the placed content, and a respective click through rate for the placed content based on multiple user activities, wherein the instructions for assigning the popularity score include:
  instructions for determining a similarity score between the user profile and a placed content profile associated with the placed content, wherein the similarity score is indicative of a level of similarity between the user profile and the associated placed content profile, and
  instructions for combining the similarity score with the respective click through rate and the respective bid value to determine the popularity score assigned to the placed content;
instructions for ranking the set of placed content according to their respective popularity scores; and
instructions for preparing for display to the user at least a subset of the set of placed content in an order determined by their respective popularity scores.

20. The computer program product of claim 19, wherein the user profile is based, at least in part, on information about the user, including information derived from a set of documents, the set of documents comprising a plurality of documents selected from the set consisting of documents identified by search results from a search engine, documents linked to the documents identified by search results from the search engine, documents linked to the documents accessed by the user, and documents browsed by the user.

21. The computer program product of claim 19, wherein the instructions for determining the similarity score include determining a mathematical distance between a user profile vector of the user profile, the user profile vector including first pairs of categories and respective weights, and a placed content profile vector of the placed content, the placed content profile vector including second pairs of categories and respective weights.

22. The computer program product of claim 19, further including instructions for associating the similarity score with a scaling factor.

23. The computer program product of claim 21, further including instructions for normalizing the similarity score to a particular range to create a scaling factor.

24. The computer program product of claim 22, wherein the instructions for assigning the popularity score to each of the set of placed content includes instructions for multiplying the scaling factor, the respective click through rate and the respective bid value.

25. The computer program product of claim 24, wherein the scaling factor associated with a maximum similarity score is less than the scaling factor associated with a mid-point similarity score.

26. The computer program product of claim 22, wherein the scaling factor is determined in accordance with statistical information relating similarity scores to click through rates.

27. The computer program product of claim 19, wherein the placed content is an advertisement.

28. A computer-implemented method of personalizing placed content associated with a search query, comprising:
receiving a search query from a user;
accessing a user profile associated with the user, wherein the user profile is based, at least in part, on query terms in a plurality of previously submitted search queries;
identifying a set of placed content based on contents of one or more documents being presented as search results to the search query;
assigning a popularity score to each of the set of placed content in accordance with the user profile, a respective bid value for the placed content, and a respective click through rate for the placed content based on multiple user activities, wherein the assigning the popularity score includes:
- determining a similarity score between the user profile and a placed content profile associated with the placed content, wherein the similarity score is indicative of a level of similarity between the user profile and the associated placed content profile, and
- combining the similarity score with the respective click through rate and the respective bid value to determine the popularity score assigned to the placed content; and ranking the set of placed content according to their respective popularity scores; and preparing for display to the user at least a subset of the set of placed content in an order determined by their respective popularity scores.

29. A computer-implemented method of personalizing placed content associated with a search query, comprising:
receiving a request from a user for a document;
accessing a user profile associated with the user, wherein the user profile is based, at least in part, on query terms in a plurality of previously submitted search queries;
identifying a set of placed content based on contents of the document being requested by the user;
assigning a popularity score to each of the set of placed content in accordance with the user profile, a respective bid value for the placed content, and a respective click through rate for the placed content based on multiple user activities, wherein the assigning the popularity score includes:
- determining a similarity score between the user profile and a placed content profile associated with the placed content, wherein the similarity score is indicative of a level of similarity between the user profile and the associated placed content profile, and
- combining the similarity score with the respective click through rate and the respective bid value to determine the popularity score assigned to the placed content; and ranking the set of placed content according to their respective popularity scores; and preparing for display to the user at least a subset of the set of placed content in an order determined by their respective popularity scores.

* * * * *